US012627957B2

(12) United States Patent
Park et al.

(10) Patent No.: US 12,627,957 B2
(45) Date of Patent: May 12, 2026

(54) METHOD AND APPARATUS FOR PERFORMING RADIO ACCESS NETWORK FUNCTION BY USING DYNAMIC SCALING

(71) Applicant: SAMSUNG ELECTRONICS CO., LTD., Suwon-si (KR)

(72) Inventors: Seonjun Park, Suwon-si (KR); Joonhwan Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 18/209,288

(22) Filed: Jun. 13, 2023

(65) Prior Publication Data

US 2024/0073661 A1 Feb. 29, 2024

Related U.S. Application Data

(63) Continuation of application No. PCT/KR2023/007365, filed on May 30, 2023.

(30) Foreign Application Priority Data

Aug. 31, 2022 (KR) ........................ 10-2022-0110332
Oct. 19, 2022 (KR) ........................ 10-2022-0135232

(51) Int. Cl.
*H04W 4/50* (2018.01)
*H04W 4/60* (2018.01)
(Continued)

(52) U.S. Cl.
CPC .............. *H04W 4/50* (2018.02); *H04W 4/60* (2018.02); *H04W 28/16* (2013.01); *H04W 76/10* (2018.02); *H04W 88/18* (2013.01)

(58) Field of Classification Search
CPC ......... H04W 4/50; H04W 4/60; H04W 28/16; H04W 76/10; H04W 88/18; H04W 24/02;
(Continued)

(56) References Cited

U.S. PATENT DOCUMENTS 10,250,674 B2 4/2019 Zhang et al.
10,721,653 B2 7/2020 Futaki et al.
(Continued)

FOREIGN PATENT DOCUMENTS

KR 10-2019-0063675 A 6/2019
KR 10-2021-0044826 A 4/2021
(Continued)

OTHER PUBLICATIONS

International Search Report and Written Opinion dated Sep. 6, 2023, issued by the International Searching Authority in International Application No. PCT/KR2023/007365 (PCT/ISA/220, PCT/ISA/210, and PCT/ISA/237).
(Continued)

*Primary Examiner* — Vladimir Magloire
(74) *Attorney, Agent, or Firm* — Sughrue Mion, PLLC

(57) ABSTRACT

Provided is a 5$^{th}$ generation (5G) or 6$^{th}$ generation (6G) communication system for supporting a data rate higher than that of a 4$^{th}$ generation (4G) communication system such as long term evolution (LTE). A method of performing communication by a first distributed unit (DU) in a wireless communication system may include identifying, based on resource usage amount information of the first DU, whether a connection to at least one second DU is requested, obtaining, based on a result of the identifying, inter-DU interface setup information for connection to the at least one second DU, and performing, based on the obtained inter-DU interface setup information, the connection to the at least one second DU for transmission and reception of a packet.

18 Claims, 14 Drawing Sheets

(51) Int. Cl.
  H04W 28/16 (2009.01)
  H04W 76/10 (2018.01)
  H04W 88/18 (2009.01)

(58) Field of Classification Search
  CPC ... H04W 76/11; H04W 88/08; H04W 88/085;
                    H04W 92/04; H04W 92/20
  See application file for complete search history.

(56) References Cited

U.S. PATENT DOCUMENTS

| | | | |
|---|---|---|---|
| 11,425,601 B2 | 8/2022 | Noriega | |
| 2020/0229258 A1 | 7/2020 | Wang et al. | |
| 2020/0305128 A1 | 9/2020 | Abedini et al. | |
| 2020/0337113 A1 | 10/2020 | Na et al. | |
| 2020/0351874 A1 | 11/2020 | Luo et al. | |
| 2021/0385661 A1 | 12/2021 | Centonza et al. | |
| 2022/0052915 A1 | 2/2022 | Estevez | |
| 2022/0078733 A1 | 3/2022 | Li et al. | |
| 2022/0086672 A1 | 3/2022 | Abedini et al. | |
| 2022/0191749 A1* | 6/2022 | Damnjanovic | H04W 36/087 |
| 2024/0073661 A1* | 2/2024 | Park | H04W 24/02 |
| 2025/0106922 A1* | 3/2025 | Chandrashekar | H04W 76/16 |

FOREIGN PATENT DOCUMENTS

| | | |
|---|---|---|
| KR | 10-2021-0086357 A | 7/2021 |
| KR | 10-2022-0037321 A | 3/2022 |

OTHER PUBLICATIONS

Huawei, "Rapporteur: Editorial updates," R3-201267, 3GPP TSG-RAN3 Meeting #107-e, Mar. 2020, Total 231 pages.
"3GPP TS 38.473 V17.1.0," Technical Specification, 3rd Generation Partnership Project; Technical Specification Group Radio Access Network; NG-RAN; F1 application protocol (F1AP) (Release 17), Jun. 2022, Total 668 pages.
"Virtualized RAN—vol. 2," SAMSUNG, Technical White Paper, Apr. 2021, Total 16 pages.
"3GPP TS 38.470 V16.7.0," Technical Specification, 3rd Generation Partnership Project; Technical Specification Group Radio Access Network; NG-RAN; F1 general aspects and principles (Release 16), Jun. 2022, Total 17 pages.
"Open Midhaul F1 Interface F1-C and F1-U," Techplayon, Apr. 2021, Total 4 pages.
"3GPP TS 38.473 V15.3.0," Technical Specification, 3rd Generation Partnership Project; Technical Specification Group Radio Access Network; NG-RAN; F1 application protocol (F1AP) (Release 15), Sep. 2018, Total 176 pages.
"3GPP TS 29.281 V17.3.0," Technical Specification, 3rd Generation Partnership Project; Technical Specification Group Core Network and Terminals; General Packet Radio System (GPRS) Tunnelling Protocol User Plane (GTPv1-U) (Release 17), Jun. 2022, Total 35 pages.
"3GPP TS 38.401 V17.1.1," Technical Specification, 3rd Generation Partnership Project; Technical Specification Group Radio Access Network; NG-RAN; Architecture description (Release 17), Jul. 2022, Total 122 pages.
Communication dated Oct. 20, 2025 issued by the European Patent Office in European Patent Application No. 23860602.4.

* cited by examiner

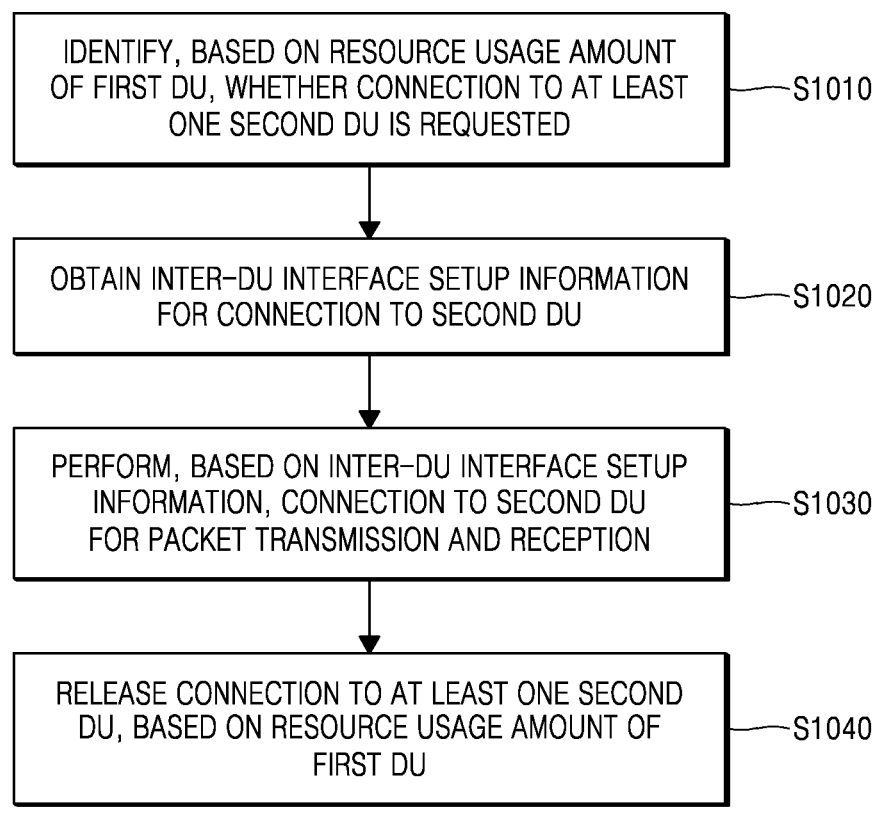

IDENTIFY, BASED ON RESOURCE USAGE AMOUNT OF FIRST DU, WHETHER CONNECTION TO AT LEAST ONE SECOND DU IS REQUESTED — S1010

OBTAIN INTER-DU INTERFACE SETUP INFORMATION FOR CONNECTION TO SECOND DU — S1020

PERFORM, BASED ON INTER-DU INTERFACE SETUP INFORMATION, CONNECTION TO SECOND DU FOR PACKET TRANSMISSION AND RECEPTION — S1030

RELEASE CONNECTION TO AT LEAST ONE SECOND DU, BASED ON RESOURCE USAGE AMOUNT OF FIRST DU — S1040

METHOD AND APPARATUS FOR PERFORMING RADIO ACCESS NETWORK FUNCTION BY USING DYNAMIC SCALING

CROSS-REFERENCE TO RELATED APPLICATIONS

This application is a by-pass continuation application of International Application No. PCT/KR2023/007365, filed on May 30, 2023, which based on and claims priority to Korean Patent Application No. 10-2022-0110332, filed on Aug. 31, 2022, in the Korean Intellectual Property Office, and Korean Patent Application No. 10-2022-0135232, filed on Oct. 19, 2022, in the Korean Intellectual Property Office, the disclosures of which are incorporated by reference herein in their entireties.

BACKGROUND

1. Field

The disclosure relates to a wireless communication system, and more particularly, to a method and apparatus for efficiently performing a radio network function via dynamic scaling in/out.

2. Description of Related Art

Based on the development of wireless communication from generation to generation, communication technologies have been developed mainly for services targeting humans, such as voice calls, multimedia services, data services, or any other known services. Following the commercialization of $5^{th}$ generation (5G) communication systems, it is expected that connected devices that have been exponentially growing in number will be connected to communication networks. Examples of devices connected to networks may include vehicles, robots, drones, home appliances, displays, smart sensors connected to various infrastructures, construction machines, factory equipment, or any other known devices. Mobile devices are expected to evolve in various form-factors such as augmented reality glasses, virtual reality headsets, hologram devices, or any other known wearable device. In order to provide various services by connecting hundreds of billions of devices in the $6^{th}$ generation (6G) era, there have been ongoing efforts to develop enhanced 6G communication systems. For these reasons, 6G communication systems are referred to as beyond-5G systems.

6G communication systems, which are expected to be commercialized around 2030, will have a peak data rate of tera (i.e., 1,000 giga)-level bps and radio latency less than 100 µsec. For example, the 6G communication systems will be 50 times as fast as 5G communication systems and have $\frac{1}{10}$ the radio latency thereof.

In order to achieve such a high data rate and ultra-low latency, it has been considered to implement the 6G communication systems in a terahertz band (e.g., 95 GHz to 3 THz bands). However, due to severe path loss and atmospheric absorption in the terahertz bands compared to the path loss in mmWave bands introduced in 5G, technologies capable of securing the signal transmission distance (e.g., coverage), will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. Furthermore, in order to improve the coverage of terahertz-band signals, there has been exploration of new technologies such as metamaterial-based lenses and antennas, a high-dimensional spatial multiplexing technology using orbital angular momentum (OAM), reconfigurable intelligent surface (RIS), and other suitable networking technologies.

Moreover, in order to improve spectral efficiency and overall network performance, the following technologies have been developed for 6G communication systems: a full-duplex technology for enabling an uplink transmission and a downlink transmission to simultaneously use the same frequency resource at the same time; a network technology for using satellites, high-altitude platform stations (HAPS), and other suitable network components in an integrated manner; an improved network structure for supporting mobile base stations and other suitable network components and enabling network operation optimization and automation and other network performance metrics; a dynamic spectrum sharing technology via collision avoidance based on a prediction of spectrum usage; use of artificial intelligence (AI) in wireless communication for improvement of overall network operation by using AI in a designing phase for developing 6G and internalizing end-to-end AI support functions; and a next-generation distributed computing technology for overcoming the limit of UE computing ability through reachable super-high-performance communication and computing resources (e.g., such as mobile edge computing (MEC), clouds, and other computer resources) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will allow the next hyper-connected experience. For example, it is expected that services such as truly immersive extended reality (XR), high-fidelity mobile hologram, and digital replica may be provided through the 6G communication systems. In addition, services such as remote surgery for security and reliability enhancement, industrial automation, and emergency response will be provided through the 6G communication system, such that the technologies may be applied in various fields such as industry, medical care, automobiles, home appliances, or any other known industries.

SUMMARY

According to an aspect of the disclosure, a method of performing communication by a first distributed unit (DU) in a wireless communication system, includes: identifying, based on resource usage amount information of the first DU, whether a connection to at least one second DU is requested; obtaining, based on a result of the identifying, inter-DU interface setup information for the connection to the at least one second DU; and performing, based on the obtained inter-DU interface setup information, the connection to the at least one second DU for transmission and reception of one or more packets.

According to an aspect of the disclosure, a method of performing communication by at least one second distributed unit (DU) in a wireless communication system, includes: identifying, based on resource usage amount information of a first DU, whether a connection to the first DU is requested; obtaining, based on a result of the identifying, inter-DU interface setup information for the connection to the first DU; and performing, based on the obtained inter-DU interface setup information, the connection to the first DU for transmission and reception of one or more packets.

According to an aspect of the disclosure, a method of performing communication by an operation administration maintenance (OAM) entity in a wireless communication system, includes: identifying, based on resource usage amount information of a first distributed unit (DU), whether a connection to at least one second DU is requested; transmitting, based on a result of the identifying, inter-DU interface setup information for the connection to the first DU or the at least one second DU; and identifying a first radio unit (RU) to be migrated to the at least one second DU from among at least one RU connected to the first DU, wherein a connection for transmission and reception of one or more packets is performed between the first DU and the at least one second DU based on the inter-DU interface setup information.

According to an aspect of the disclosure, a first distributed unit (DU) for performing communication in a wireless communication system, includes; and at least one processor coupled with the transceiver and configured to: identify, based on resource usage amount information of the first DU, whether a connection to at least one second DU is requested; obtain, based on a result of the identifying, inter-DU interface setup information for the connection to the at least one second DU; and based on the obtained inter-DU interface setup information, perform the connection to the at least one second DU for transmission and reception of one or more packets.

According to an aspect of the disclosure, a second distributed unit (DU) for performing communication in a wireless communication system, includes: a transceiver; and at least one processor coupled with the transceiver and configured to: identify, based on resource usage amount information of a first DU, whether a connection to the first DU is requested; obtain, based on a result of the identifying, inter-DU interface setup information for the connection to the first DU; and based on the obtained inter-DU interface setup information, perform the connection to the first DU for transmission and reception of one or more packets.

According to an aspect of the disclosure, an operation administration maintenance (OAM) entity for performing communication in a wireless communication system, includes: a transceiver; and at least one processor coupled with the transceiver and configured to: identify, based on resource usage amount information of a first distributed unit (DU), whether a connection to at least one second DU is requested; transmit inter-DU interface setup information for the connection to the first DU or the at least one second DU; and identify a first radio unit (RU) to be migrated to the at least one second DU from among at least one RU connected to the first DU, wherein the connection for transmission and reception of one or more packets is performed between the first DU and the at least one second DU based on the inter-DU interface setup information.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates architecture of a radio access network (RAN);

FIG. 2 illustrates architecture of an RAN after dynamic scaling, according to an embodiment of the disclosure;

FIG. 5 illustrates a diagram for describing a structure and interfaces of an RAN after dynamic scaling, according to an embodiment of the disclosure;

FIG. 7 illustrates a diagram for describing a method of processing a downlink (DL) packet when scaling out is performed, according to an embodiment of the disclosure;

FIG. 8 illustrates a diagram for describing a method of processing an uplink (UL) packet when scaling out is performed, according to an embodiment of the disclosure;

FIG. 10 illustrates a diagram for describing a method of scaling in of a DU, according to an embodiment of the disclosure;

DETAILED DESCRIPTION

Figure 3:
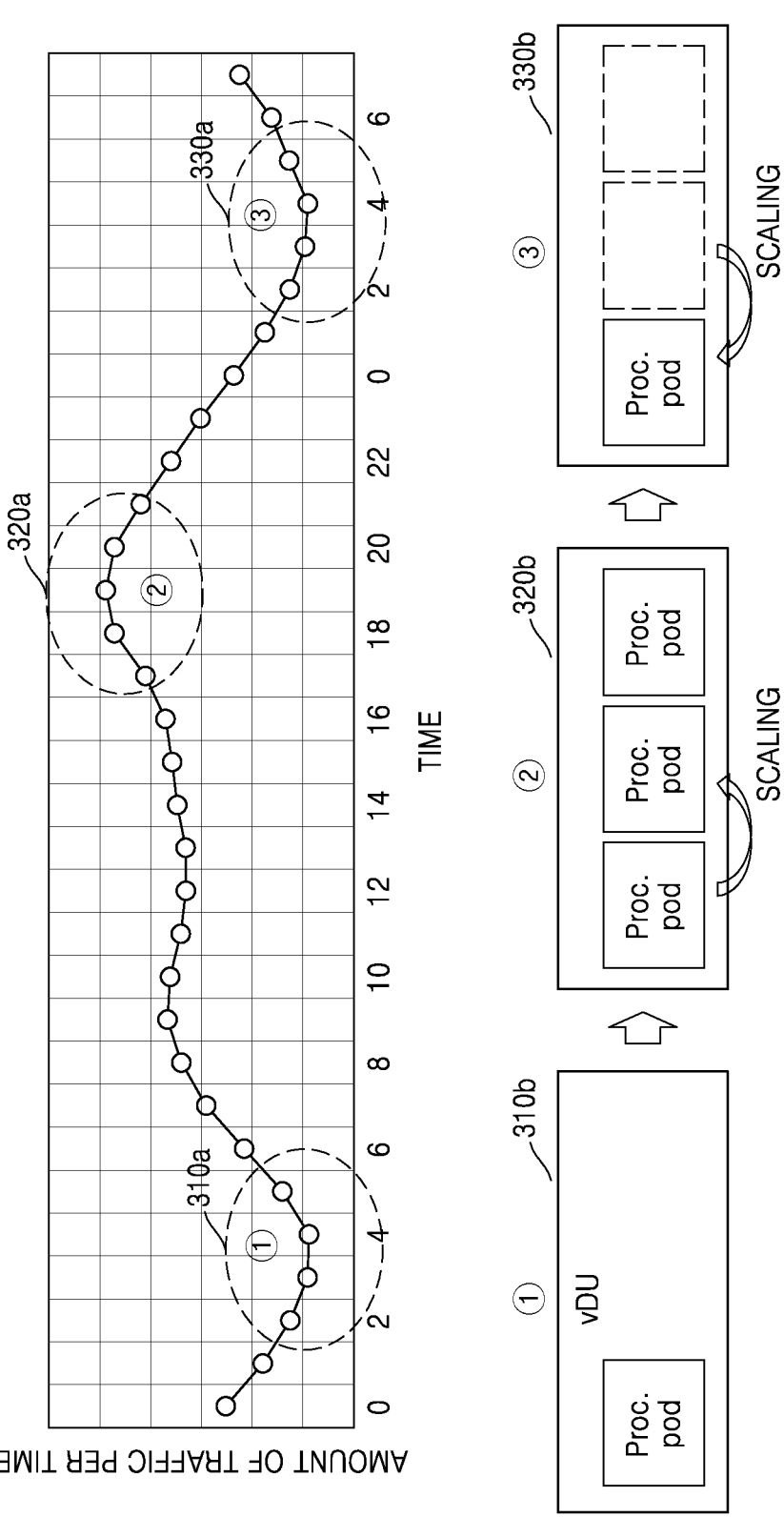
FIG. 3 illustrates a diagram for describing a method of scaling in/out of a distributed unit (DU), based on a traffic change in the DU, according to an embodiment of the disclosure.

Hereinafter, embodiments of the disclosure will now be described more fully with reference to the accompanying drawings.

As the disclosure allows for various changes and numerous embodiments, particular embodiments will be illustrated in the drawings and described in detail in the written descriptions. However, this is not intended to limit the disclosure to particular modes of practice, and it is to be appreciated that all changes, equivalents, and substitutes that do not depart from the spirit and technical scope of the disclosure are encompassed in the disclosure.

In the descriptions of embodiments, detailed explanations of the related art are omitted when it is deemed that they may unnecessarily obscure the essence of the disclosure. Also, numerals (e.g., "first", "second", and the like) in descriptions of the specification are used only to distinguish one element from another element.

Although the terms used in the embodiments of the disclosure are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

The scope of the disclosure may be defined by the appended claims, rather than defined by the aforementioned detailed descriptions. Various features mentioned in one claim category (for example, a method claim) of the disclosure may also be claimed in another claim category (for example, a system claim). Furthermore, one or more embodiments of the disclosure may include not only a combination of features specified in the claims, but also include various combinations of individual features in the claims. It should be interpreted that the scope of the disclosure includes the meanings and scope of the claims and all changes or modifications derived from the equivalent concept thereof.

Furthermore, in the disclosure, it will be understood that when elements are "connected" or "coupled" to each other, the elements may be directly connected or coupled to each other, but may be alternatively connected or coupled to each other with an intervening element therebetween, unless there is a particular description contrary thereto. In addition, the elements may be "directly connected" or "physically connected" to each other, or may be "electrically connected" to each other with an intervening element therebetween. In the disclosure, the terms "transmit", "receive", and "communicate" include both direct communication and indirect communication. Throughout the disclosure, when a part "includes" or "comprises" an element, unless there is a particular description contrary thereto, the part may further include other elements, not excluding the other elements.

In the disclosure, regarding an element represented as a "-er/or (unit)", or a "module", two or more elements may be combined into one element or one element may be divided into two or more elements according to subdivided functions. Such function may be realized via hardware or software, or via a combination of hardware and software. In addition, each element described hereinafter may additionally perform some or all of functions performed by another element, in addition to main functions of itself, and some of the main functions of each element may be performed entirely by another element.

As used herein, the singular forms are intended to include the plural forms as well, unless the context clearly indicates otherwise. All terms including descriptive or technical terms which are used herein should be construed as having meanings that are obvious to one of ordinary skill in the art.

Throughout the disclosure, the term "or" is inclusive and not exclusive, unless there is a particular description contrary thereto. Accordingly, unless differently stated clearly or contextually, "A or B" may include A, B, or both A and B. In the disclosure, the expression "at least one of" or "one or more of" may include different combinations of one or more items in listed items or include only one item among the listed items. For example, "at least one of A, B, or C" may indicate only A, only B, only C, both A and B, both A and C, both B and C, or all of A, B, and C.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. In addition, portions irrelevant to the description will be omitted in the drawings for a clear description of the disclosure, and like reference numerals will denote like elements throughout the specification.

Although a long term evolution (LTE), LTE-Advanced (LTE-A), or 5th generation (5G) system is mentioned as an example in the following description, embodiments of the disclosure may also be applied to other communication systems having similar technical backgrounds or channel types. For example, 5G-Advance or New Radio (NR)-Advance or 6th generation (6G) (beyond 5G) mobile communication technology, which is developed after a 5G mobile communication technology (or New Radio (NR)), may be included therein, and hereinafter, 5G may refer to a concept including legacy LTE, LTE-A, and other similar communication services. Furthermore, the disclosure is applicable to other communication systems through modification at the discretion of one of ordinary skill in the art without greatly departing from the scope of the disclosure.

The terms used in the disclosure will now be briefly defined, and an embodiment of the disclosure will be described in detail.

The terms used in the specification are defined in consideration of functions used in the disclosure, and can be changed according to the intent or commonly used methods of users or operators. Accordingly, definitions of the terms are understood based on the entire descriptions of the present specification.

Hereinafter, a base station (BS) may be an entity that allocates resources to a user equipment (UE), and may be at least one of a next-generation node B (gNode B), an evolved node B (eNode B), a Node B, (or xNode B (where, x indicates an alphabet letter including g or e), a radio access unit, a BS controller, a satellite, an airborne entity, or a node on a network. In the disclosure, a BS may be interpreted as a BS itself, a cell, or a radio unit (RU), and an object that exchanges a message with a UE may be a distributed unit (DU) or a centralized unit (CU).

In one or more examples, in the disclosure, a UE may include an MS, a cellular phone, a smartphone, a computer, a vehicle, a satellite, or a multimedia system enabled to perform a communication function.

In the disclosure, a cell may indicate an area covered by one BS in wireless communication. The cell may be classified into a mega cell, a macro cell, a micro cell, a picocell, or any other cell structure known to one of ordinary skill in the art, based on a size of the cell. However, as understood by one of ordinary skill in the art, these configurations are merely an example and the types of the cell are not limited thereto.

In one or more examples, in the disclosure, the DU may execute parts of a radio link control (RLC) layer, a medium access control (MAC) layer, and a physical (PHY) layer which are connected to the RU and the CU. In an embodiment of the disclosure, the DU may include a virtualized DU.

In one or more examples, in the disclosure, the CU is a central entity including a radio resource control (RRC) layer, a service data association protocol (SDAP) layer, and a packet data convergence protocol (PDCP) layer. One CU may manage one or more DUs and may be connected to a DU via an F1 interface. In an embodiment of the disclosure, the CU may include a virtualized CU.

In one or more examples, in the disclosure, an RU functions to convert a radio signal into a digital signal for transmission via a packet network.

In one or more examples, in the disclosure, a downlink (DL) refers to a radio transmission link for transmitting data or a control signal from a BS to a UE. In the LTE system, an orthogonal frequency division multiplexing (OFDM) scheme may be used in the DL.

In one or more examples, in the disclosure, an uplink (UL) refers to a radio transmission link for transmitting data or a control signal from a UE to a BS. In the LTE system, a single carrier frequency division multiplexing access (SC-FDMA) scheme is used in the UL.

In one or more examples, in the disclosure, a packet indicates a unit for transmitting a signal associated with data or control. The packet may include all DL signals or UL signals, the signals being associated with data or control.

Hereinafter, terms indicating broadcasting information, terms indicating control information, terms related to communication coverage, terms indicating a state change (e.g., event), terms indicating network entities, terms indicating messages, terms indicating elements of an apparatus, or the like, as used in the following description, are exemplified for convenience of descriptions. Accordingly, the disclosure is not limited to terms to be described below, and other terms indicating objects having equal technical meanings may be used.

For convenience of descriptions, in the disclosure, terms and names or modifications of the terms and names defined in the 3$^{rd}$ Generation Partnership Project Long Term Evolution (3GPP LTE) standard are used therein. However, the disclosure is not limited to these terms and names, and may be equally applied to wireless communication systems conforming to other standards. For example, although 5G (or NR) systems are mentioned as examples in the following description, embodiments of the disclosure may also be applied to other wireless communication systems having similar technical backgrounds or channel types. As another example, embodiments of the disclosure may be applied to a LTE or LTE-A system which is a wireless communication system before the NR system, and furthermore, embodiments of the disclosure may be applied to a wireless communication system developed after the NR system. Furthermore, the embodiments of the disclosure may also be applied to other communication systems through partial modification without greatly departing from the scope of the disclosure based on determination by one of ordinary skill in the art.

Figure 1:
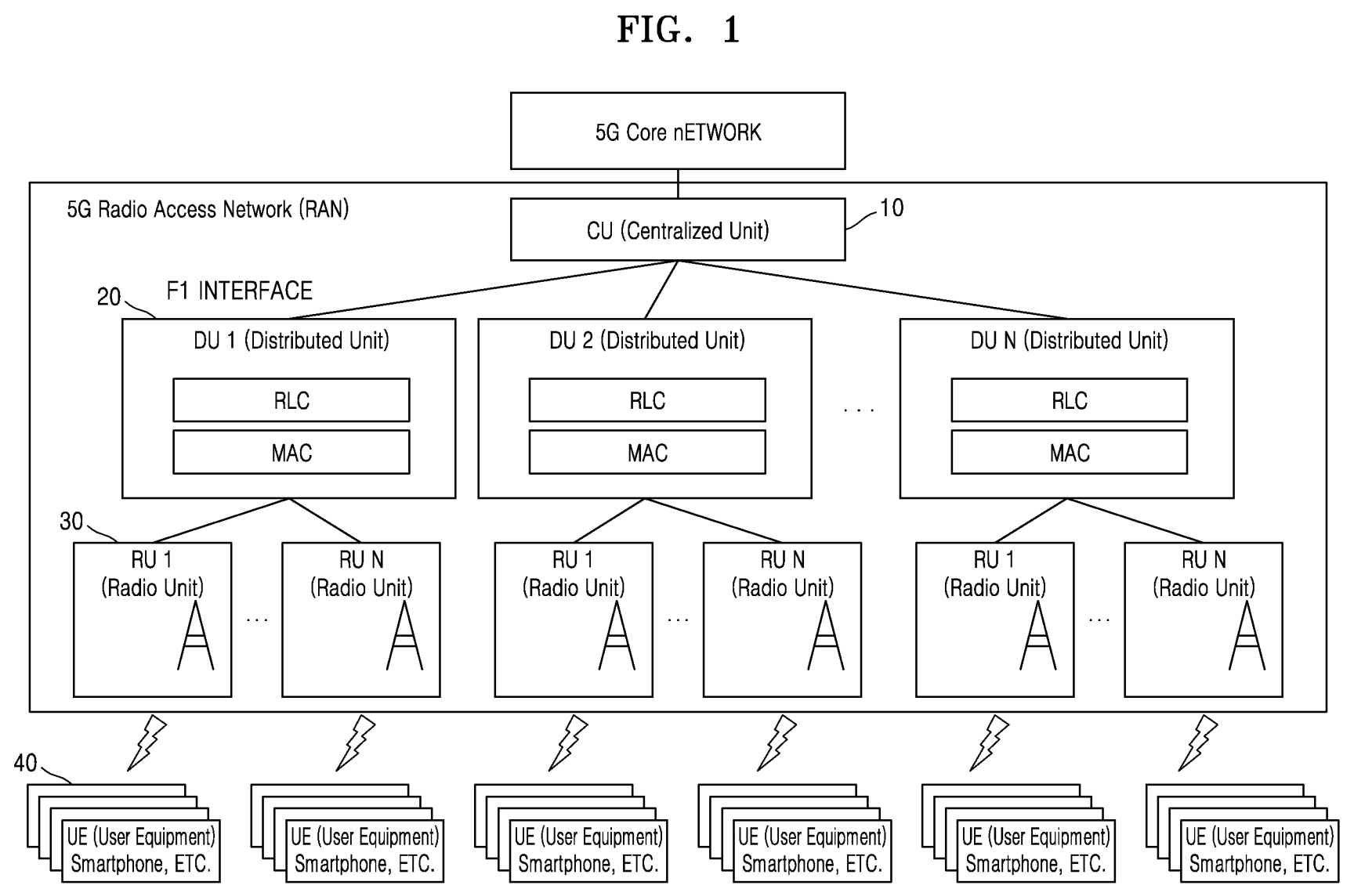

FIG. 1 illustrates architecture of a radio access network (RAN).

Referring to FIG. 1, the RAN may be a network for supporting a radio access to a UE and may be a set of BSs. The RAN may be broadly divided into a CU 10, a DU 20, and an RU 30. In one or more examples, according to a topology of a legacy RAN, an RU, a DU, and a CU are N:M:1 (N>M>1). A cell may correspond to an area covered by a BS in a wireless communication system, and at least one cell may exist for each BS.

The CU 10 may receive a signal from the DU 20 or transmit a signal to the DU 20 via an F1 interface. One CU 10 may be connected to a plurality of DUs 20, and when the number of DUs 20 is dynamically changed, this may break the F1 interface.

The DU 20 may process a signal received from the RU 30, and may transmit the processed signal to the CU 10 via the F1 interface. In one or more examples, the DU 20 may process a signal received from the CU 10 via the F1 interface, or may transmit a signal to the RU 30. The DU 20 may perform various radio access network functions for processing a signal. The radio access network functions may include an RLC layer function, a MAC layer function, a higher-physical (H-PHY) layer function, or any other suitable functions known to one of ordinary skill in the art. However, as understood by one of ordinary skill in the art, these functions are merely examples and the radio access network functions are not limited to the examples above.

Hereinafter, functions of an RLC layer, a MAC layer, and a PHY layer will now be described.

The function of the RLC layer may include one or more of the non-limiting functions specified below:

Transfer of upper layer packet data units (PDUs);
In-sequence delivery of upper layer PDUs;
Out-of-sequence delivery of upper layer PDUs;
Error correction through automatic repeat request (ARQ);
Concatenation, segmentation and reassembly of RLC service data units (SDUs);
Re-segmentation of RLC data;
Reordering of RLC data;
Duplicate detection;
Protocol error detection;
RLC SDU discard; and
RLC re-establishment.

In one or more embodiments, an in-sequence delivery function of the RLC layer may indicate a function of delivering RLC SDUs received from a lower layer, to an upper layer in order of sequence of delivery. The in-sequence delivery function may include a function of reassembling RLC SDUs and delivering the reassembled RLC SDU when the RLC SDUs segmented from one RLC SDU are received. In one or more examples, the in-sequence delivery function may include at least one of a function of reordering received RLC PDUs on a RLC sequence number (SN) or PDCP SN basis, a function of recording missing RLC PDUs by reordering the received RLC PDUs, or a function of reporting status information of the missing RLC PDUs to a transmitter. In one or more examples, the in-sequence delivery function may include a function of requesting to retransmit the missing RLC PDUs, and a function of delivering only RLC SDUs prior to a missing RLC SDU, to an upper layer in order when the missing RLC SDU exists. In one or more examples, the in-sequence delivery function may include a function of delivering, in order, all RLC SDUs received before a timer starts to an upper layer when a certain timer expires, even when a missing RLC SDU exists. In one or more examples, the in-sequence delivery function may include a function of delivering, in order, all RLC SDUs received up to a current time and an upper layer when a certain timer expires, even when a missing RLC SDU exists.

According to one or more embodiments, the RLC layer may process the RLC PDUs in order of reception and may deliver the RLC PDUs to the PDCP layer regardless of a sequence order. When a segment is received, the RLC layer may reassemble the segment with other segments stored in a buffer or segments to be subsequently received, into a whole RLC PDU, and may deliver the RLC PDU to the PDCP layer. In the NR, the RLC layer may not have a concatenation function, where the concatenation function may be performed by the MAC layer or may be replaced with a multiplexing function of the MAC layer.

The function of the MAC layer may include one or more of the non-limiting functions specified below:

Mapping between logical channels and transport channels;

Multiplexing/demultiplexing of MAC SDUs;

Scheduling information reporting;

Error correction through hybrid ARQ (HARQ);

Priority handling between logical channels of one UE;

Priority handling between UEs by means of dynamic scheduling;

Multimedia broadcast/multicast service (MBMS) service identification;

Transport format selection; and

Padding.

The function of the PHY layer may include one or more of the non-limiting functions specified below:

Data transception using an electric signal;

Channel coding/decoding function;

Modulation/demodulation function;

Power control; and

Cell searching.

According to one or more embodiments, the PHY layer may perform channel-coding and modulation on upper layer data into OFDM symbols and transmit the OFDM symbols via a wireless channel. In one or more examples, the PHY layer may perform demodulation and channel-decoding on OFDM symbols received via a wireless channel into data and deliver the data to an upper layer.

The RU 30 may transmit a signal to the DU 20 via a fronthaul interface. In one or more examples, the RU 30 may receive a signal from the DU 20 via the fronthaul interface. The fronthaul interface may be a network part for connecting the RU 30 of a cell site to the DU 20, and may perform DSP, power amplification, a filtering function, or any other suitable functions known to one of ordinary skill in the art.

In order to efficiently use resources of the DU 20, the disclosure provides one or more embodiments of a method of dynamically managing the number of DU 20s without breaking the F1 interface. Hereinafter, the CU 10, the DU 20, and the RU 30, which are described below may operate in a virtualized RAN. The virtualization may refer to a scheme by which multiple physical resources are integrated and managed so that a resource available to one apparatus may be extended.

Figure 2:
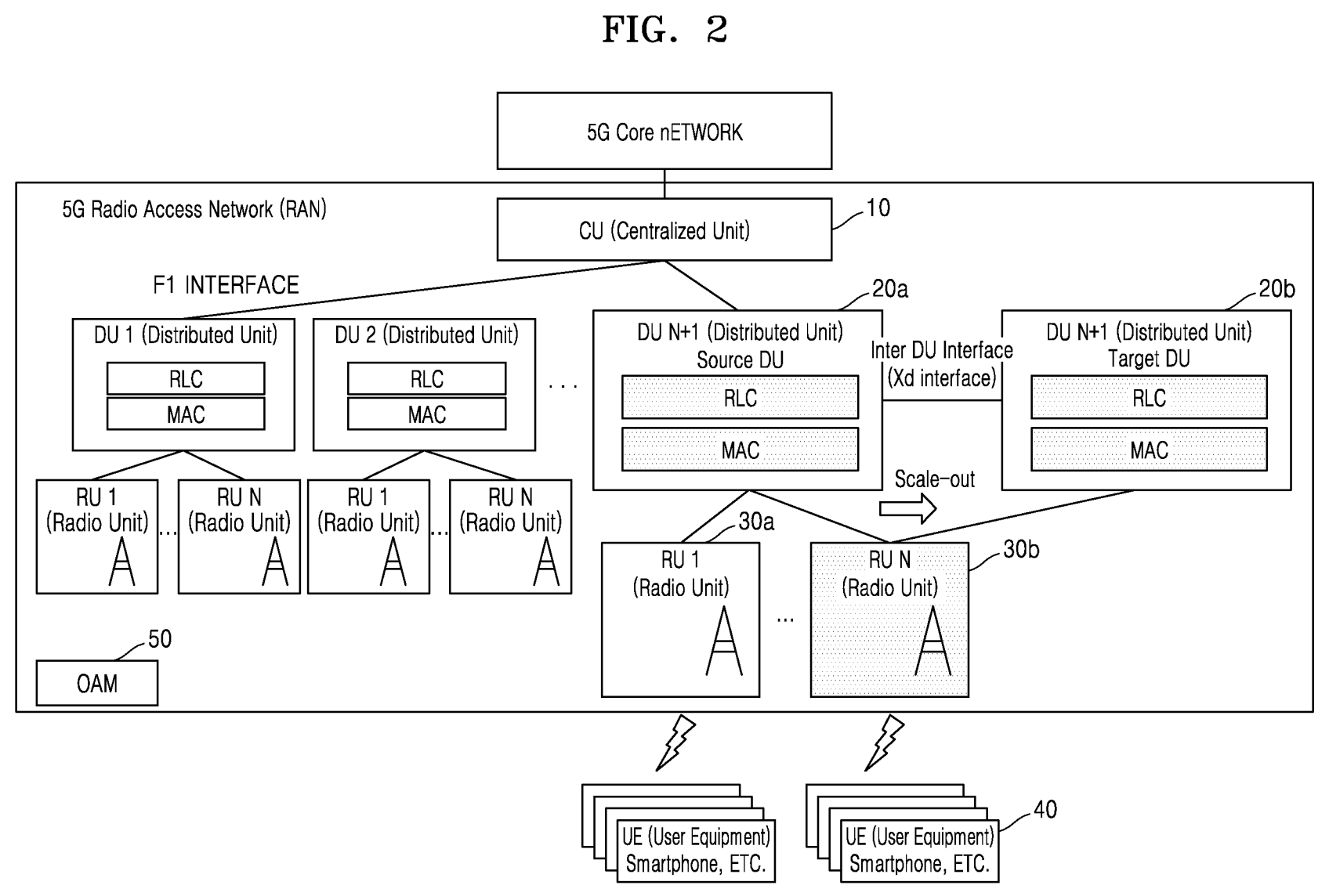

FIG. 2 illustrates architecture of an RAN after dynamic scaling, according to one or more embodiments of the disclosure.

Referring to FIG. 2, the RAN may be a network for supporting a radio access to a UE and may be a set of BSs. The RAN may be broadly divided into the CU 10, the DU 20, and the RU 30.

In order to efficiently use resources of the DU 20, the disclosure proposes a scaling in/out method by which the DU 20 corresponding to a requested resource is dynamically allocated. While N DUs 20 are connected to the CU 10, when scaling out of a DU is requested based on traffic information or resource information, N+1$^{st}$ DU 20$b$ may be added to the CU 10. According to one or more embodiments of the disclosure, necessity of scaling out or scaling in of a DU may be identified by an operation administration maintenance (OAM) 50. The OAM 50 may indicate, but is not limited to, O&M, OAM&P, OAMP, a scaling agent or a scaling controller.

According to one or more embodiments of the disclosure, the OAM 50 may compare traffic information with resource information of the DU 20, thereby determining whether to perform scaling in/out. For example, when a resource throughput of the DU 20 is greater than a preset value, scaling out may be performed. In one or more examples, the OAM 50 may compare a difference between the resource throughput of the DU 20 and traffic amount with a preset value, thereby determining whether to perform scaling in/out. Hereinafter, for convenience of descriptions, an existing DU is referred to as a first DU 20$a$, and a DU added via scaling out is referred to as a second DU 20$b$. As understood by one of ordinary skill in the art, scaling out involves adding one or more units to a system to add capacity, and scaling in involves building exiting units by integrating resources into the existing units.

According to one or more embodiments of the disclosure, the OAM 50 may periodically obtain resource information of the first DU 20$a$. Based on the resource information of the first DU 20$a$, the OAM 50 may activate the second DU 20$b$ for scaling out. Also, according to scaling out of the second DU 20$b$, the OAM 50 may determine at least one RU 30$b$ to be connected to the second DU 20$b$ from among one or more RUs 30$a$ and 30$b$ connected to the first DU 20$a$. The determined RU 30$b$ may transmit or receive a packet to or from the second DU 20$b$ via a fronthaul interface. According to one or more embodiments of the disclosure, the RU 30$b$ may release a connection to the first DU 20$a$. In one or more examples, in scaling in, a fronthaul interface between the RU 30$b$ and the first DU 20$a$ may be re-set up.

According to one or more embodiments of the disclosure, an inter-DU interface may be set up between the first DU 20$a$ and the second DU 20$b$. In one or more examples, the inter-DU interface may indicate an interface for packet transception between DUs. As the CU 10 may transmit or receive a packet by using an internet protocol (IP) of a pre-connected DU, based on F1 interface setup, the CU 10 cannot obtain information including an IP address of the dynamically-added second DU 20$b$. Therefore, the CU 10 may recognize pre-connected N DUs but cannot recognize the dynamically-added second DU 20$b$. The second DU 20$b$ may transmit or receive a packet to or from the first DU 20$a$ via the inter-DU interface by using each F1 splitter in the first DU and the second DU. A method in detail will be described below with reference to FIG. 6.

FIG. 3 illustrates a diagram for describing a method of scaling in/out of a DU, based on a traffic change in the DU, according to one or more embodiments of the disclosure.

FIG. 3 illustrates information about traffic occurring in a plurality of BSs or a CU. In one or more examples, traffic may refer to a flow of packets or data passing through a communication network during a certain time.

According to an embodiment of the disclosure, the traffic may include a data flow between a UE and a BS, and may be represented as a data rate per unit time. In one or more examples, traffic processing information (e.g., referred to as the traffic information) may include traffic information about a plurality of BSs where traffic occurs and resource information used to process the traffic occurring in the plurality of BSs. For example, the traffic information may include a traffic processing speed (e.g., bps) per cell, the number of UEs connected to an RU, a frequency band where traffic occurs, or any other network parameter known to one of ordinary skill in the art. In one or more examples, according to an embodiment of the disclosure, the resource information may indicate a ratio of a DU used to process traffic, an amount of resources of the DU used to process traffic, or any other suitable resource information known to one of ordinary skill in the art. However, as understood by one of ordinary skill in the art, the aforementioned examples are merely an illustration, and thus, the traffic information or the resource information is not limited to these examples and/or configurations.

In a legacy RAN system, a processing amount of a DU may be determined based on a maximum amount of traffic available for a cell site connected to the DU in a 1:1 manner. However, as shown in FIG. 3, since an amount of traffic per time is not constant, an efficiency of resources of the DU is decreased. For example, a maximum amount of traffic per time is observed in a time period 320a corresponding to 18:00 to 21:00, and an amount of traffic which is 20% of the maximum amount of traffic per time 320a is observed in time periods 310a and 330a of 03:00 to 05:00.

Since an amount of traffic is not constant, the embodiments of the present disclosure provide a method of efficiently using resources of a DU. According to one or more embodiments, a method of dynamically allocating a DU corresponding to a requested resource, based on traffic information or resource information, without breaking an F1 interface, is disclosed.

According to an embodiment of the disclosure, the OAM 50 may obtain traffic information or resource information, and may identify whether to additionally connect the DU 20, based on the obtained information. According to an embodiment of the disclosure, the OAM 50 may be an entity separate from a CU or a DU, or may be an entity existing outside of the network. In one or more examples, in scaling in/out of the DU 20, the OAM 50 may identify the RU 30 to be connected to the DU 20, and may provide the DU 20 with information about the identified RU 30.

For example, in the time period 310a, where the amount of traffic per time is small (e.g., traffic is below a predetermined traffic threshold), traffic is processed with one DU (310b). In the time period 320a, where a maximum amount of traffic per time occurs as the amount of traffic per time changes, or the amount of traffic exceeds a predetermined traffic threshold, the number of DUs is increased (e.g., via scaling out of DUs), so that a total processing amount of DUs is increased (320b). The OAM 50 may determine the number of DUs to be scaled out, based on obtained traffic information or obtained resource information. In scaling out, the CU may recognize an existing DU and a scaled-out DU as one DU, and thus, the scaled-out DU may transmit or receive a packet to or from the existing DU via an inter-DU interface. In one or more examples, the OAM 50 may determine an RU to be connected to the scaled-out DU from among at least one RU connected to the existing DU, and may provide the scaled-out DU or the existing DU with information about the determined RU.

In the time period 330a where the amount of traffic per time decreases again, the OAM 50 may decrease the number of DUs, i.e., the OAM 50 may decrease a total processing amount of DUs via scaling in of DUs (330b). As resources of a DU are dynamically allocated, it is possible to prevent that the resources of the DU are wasted. The OAM 50 may determine the number of DUs to be scaled in, based on obtained traffic information or obtained resource information. In one or more examples, at least one RU connected to a DU to be scaled in may be connected to a DU to which the RU was connected or a DU that is not to be scaled in.

Figure 4:
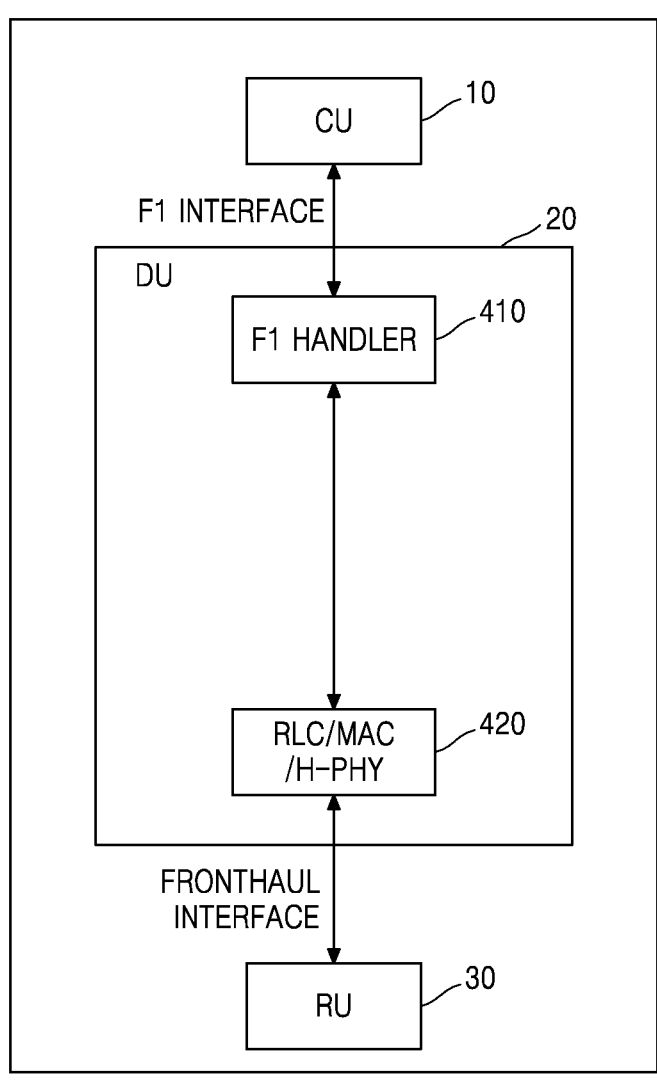
FIG. 4 illustrates a diagram for describing a structure and interfaces of an RAN.

FIG. 4 illustrates a diagram for describing a structure and interfaces of an RAN.

Referring to FIG. 4, the CU 10 and the DU 20 may be connected with each other via an F1 interface. The DU 20 and the RU 30 may be connected with each other via a fronthaul interface. In one or more examples, the DU 20 may include an F1 handler 410 for controlling the F1 interface and an RLC/MAC/H-PHY 420 for performing a wireless network communication function.

In one or more examples, the RAN may support one DU 20 in connection to one CU 10, based on the F1 interface. The F1 handler 410 of the DU 20 connected to the CU 10 is activated to perform connection based on the F1 interface. The F1 interface may include a F1-C (control plane) for control data and F1-U (data plane) for user data. A structure of F1 interface protocol is described in 3GPP TS38.470.

In one or more examples, in a structure of F1-C, a transport network layer may be based on an IP transmission comprised of stream control transmission protocol (SCTP) on IP. An application layer signaling protocol may be referred to as F1 application protocol (F1AP). In one or more examples, in a structure of F1-U, a transport network layer may be based on an IP transmission comprised of UDP and GTP-U on IP.

In one or more examples, the CU 10 on the F1 interface may obtain information about the DU 20, and manage the DU 20 based on the obtained IP information about the DU 20. Therefore, when a DU is dynamically scaled out, as in an embodiment of the disclosure, a new DU may be allocated a new IP different from that of an existing DU, thereby resulting in the CU being unable to recognize and manage the new IP on the F1 interface. An advantageous method of not breaking the F1 interface when the DU is dynamically scaled out will be described in detail below with reference to FIG. 5. An example of not breaking the F1 interface includes maintaining an existing F1 interface between an existing DU and a CU when an a new DU is added.

In the RAN, the DU 20 may perform various radio access network functions to process a signal. The radio access network functions may include an RLC layer function, a MAC layer function, an H-PHY layer function, or any other functions known to one of ordinary skill in the art. However, as understood by one of ordinary skill in the art, these functions are merely examples and the radio access network functions are not limited to the examples above. Detailed network functions are disclosed with respect to FIG. 1.

The RU 30 may transmit or receive a signal to or from the DU 20 via the fronthaul interface. The fronthaul interface is a network part for connecting the RU 30 to the DU 20, and may perform DSP, power amplification, a filtering function, or the like.

Figure 5:
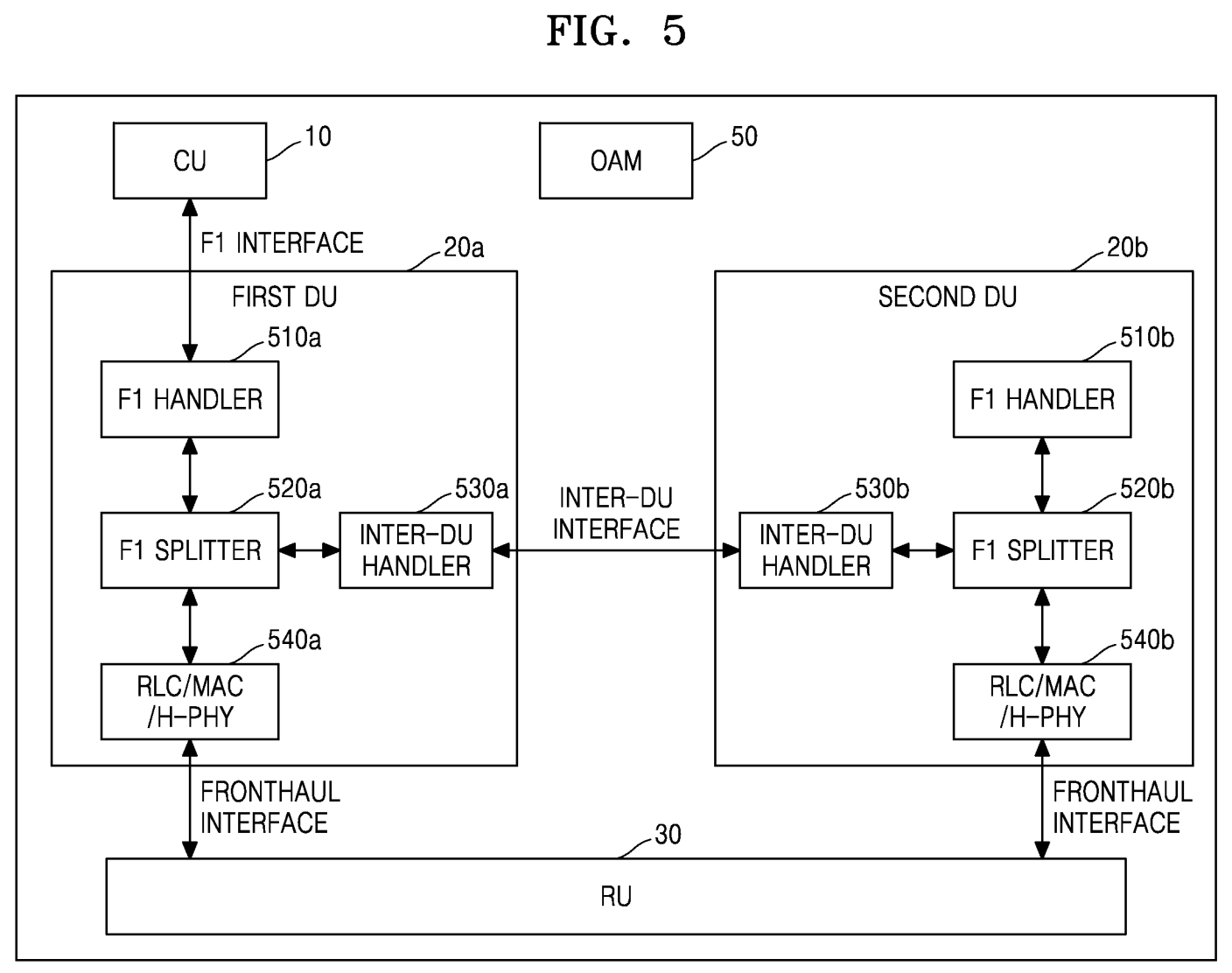

FIG. 5 illustrates a diagram for describing a structure and interfaces of an RAN after dynamic scaling, according to an embodiment of the disclosure. Hereinafter, a structure that overlaps that of FIG. 4 is not described in detail for brief description of the specification.

Referring to FIG. 5, the CU 10 and the first DU 20a may be connected with each other via an F1 interface. The DU 20a and the RU 30 may be connected with each other via a fronthaul interface, and the DU20B and the RU 30 may be connected with each other via the fronthaul interface. According to scaling out of DU, the first DU 20a and at least one second DU 20b are connected with each other via an inter-DU interface. The inter-DU interface is an interface for packet transception between the DUs 20a and 20b, and is controlled by F1 splitters 520a and 520b and inter-DU handlers 530a and 530b. According to an embodiment of the disclosure, there may be a plurality of second DUs 20b. When there are a plurality of second DUs 20b, the first DU 20a may set up an inter-DU interface with each of the plurality of second DUs 20b. The OAM 50 may determine the RU 30 to be connected to each of the plurality of second DUs 20b. According to an embodiment of the disclosure, the first DU 20a may be referred to as a master DU and the second DU 20b may be referred to as a slave DU.

The CU 10 may set up an F1 interface with the first DU 20a and may transmit or receive a packet via the F1 interface. The first DU 20a may transmit, to the CU 10, IP information with an F1 interface setup request, and the CU 10 may set up the F1 interface with the first DU 20a based on the received IP information. The CU 10 may transmit or receive a packet to or from the second DU 20b via the first DU 20a. For example, a DL packet that has be transmitted to the second DU 20b may be transmitted from the CU 10 to the first DU 20a, and may be transmitted to the second DU 20b via the inter-DU interface by the F1 splitter 520a and 520b. In one or more examples, a UL packet may be transmitted from the second DU 20b to the first DU 20a via the inter-DU interface and then may be transmitted and/or forwarded to the CU 10. According to an embodiment of the disclosure, a UL packet from the second DU 20b may be combined with a UL packet of the first DU 20a and the combination may be transmitted to the CU 10.

The first DU 20a may be connected to the CU 10 via the F1 interface, may be connected to the second DU 20b via the inter-DU interface, and may be connected to the RU 30 via the fronthaul interface. According to an embodiment of the disclosure, a connection between the CU 10 and the first DU 20a may be activated based on the F1 interface, thereby removing the need for a direct connection between the CU 10 and the second DU 20b does not occur. For example, an F1 handler 510a of the first DU 20a is activated, and thus, may perform connection to the CU 10, based on the F1 interface. An F1 handler 510b of the second DU 20b may remain inactive.

According to an embodiment of the disclosure, the F1 splitter 520a of the first DU 20a may transmit a packet to a destination according to the content of the packet. For example, in a case of a DL packet received from the CU 10 via the F1 interface, the first DU 20a may directly process the packet, according to the content of data thereof, or may transmit the packet to the second DU 20b. When the first DU 20a transmits the DL packet to the second DU 20b, the first DU 20a may transmit the packet by using the F1 splitters 520a and 520b and the inter-DU handlers 510a and 510b. In one or more examples, the F1 splitters 520a and 520b may control the DU 20 to directly process a packet or may transmit the packet to the RU 30 according to the content of the packet.

According to an embodiment of the disclosure, the inter-DU handlers 530a and 530b may set up the inter-DU interface between the DUs 20a and 20b, based on obtained inter-DU interface setup information. The inter-DU interface setup information may include F1 interface setup information between the first DU 20a and the CU 10. In one or more examples, the inter-DU handlers 530a and 530b may transmit or receive, via the inter-DU interface, a packet received from the F1 splitters 520a and 520b.

The first DU 20a and the RU 30 may be connected with each other via the fronthaul interface. As understood by one of ordinary skill in the art, the fronthaul interface is a network part for connecting the RU 30 to the DU 20, and may perform DSP, power amplification, a filtering function, or any other suitable functions known to one of ordinary skill in the art. The first DU 20a and the RU 30 may transceive a UL packet and/or a DL packet via the fronthaul interface. According to an embodiment of the disclosure, the OAM 50 may determine at least one RU to be connected to a DU according to scaling out. According to scaling out, the RU may set up a fronthaul interface with the new RU, and may transmit or receive a packet.

The second DU 20b may be connected to the first DU 20a via the inter-DU interface and may be connected to the RU 30 via the fronthaul interface. The RU 30 may release connection to the first DU 20a, according to scaling out. In one or more examples, the RU 30 may release the connection to the second DU 20b and may reconnect to the first DU 20a according to scaling in.

According to an embodiment of the disclosure, the F1 splitter 520b of the second DU 20b may identify whether to directly process a packet or transmit the packet to the RU 30 based on content of the DL packet received from the first DU 20a. Packet transmission and reception between the second DU 20b and the RU 30 may be performed based on the fronthaul interface. A UL packet generated by the second DU 20b or received from the RU 30 may be transmitted to the first DU 20a via the inter-DU interface by using the F1 splitters 520a and 520b.

According to an embodiment of the disclosure, the OAM 50 may identify, based on traffic information or resource information, whether a connection to at least one second DU 20b is requested. For example, when an amount of traffic is greater than a processing capability of the first DU 20a, the OAM 50 may determine that connection to at least one second DU 20b is requested. The amount of traffic may be compared with a traffic threshold to determine whether the connection is requested. According to an embodiment of the disclosure, the second DU 20b may request the first DU 20a for inter-DU interface setup information. Based on the inter-DU interface setup information obtained in response to the request, the second DU 20b may set up an inter-DU interface with the first DU 20a. The inter-DU interface setup information may include F1 interface setup information between the first DU 20a and the CU 10. In one or more examples, the OAM 50 may identify at least one RU 30 or UE 40 to be connected to the DU 20, based on a resource usage amount of the first DU 20a, according to scaling in/out.

Figure 6A:
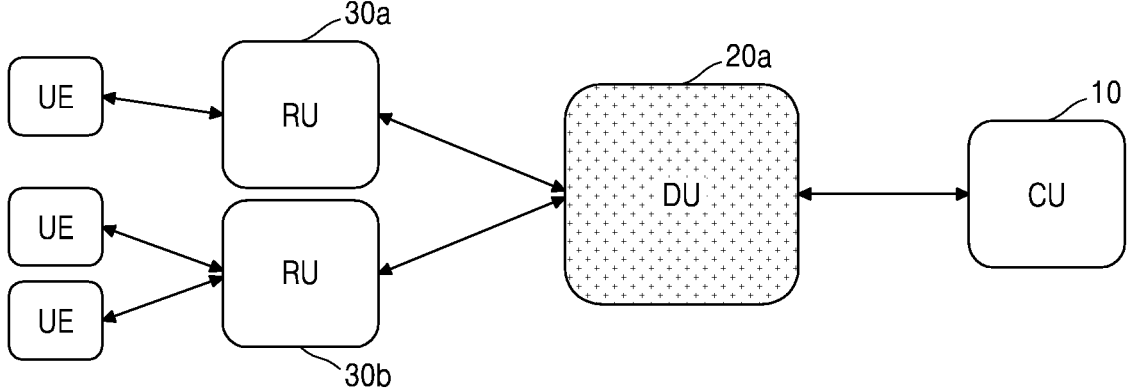
FIGS. 6A, 6B, and 6C illustrate diagrams for describing a method of scaling out of a DU, according to an embodiment of the disclosure.
Figure 6B:
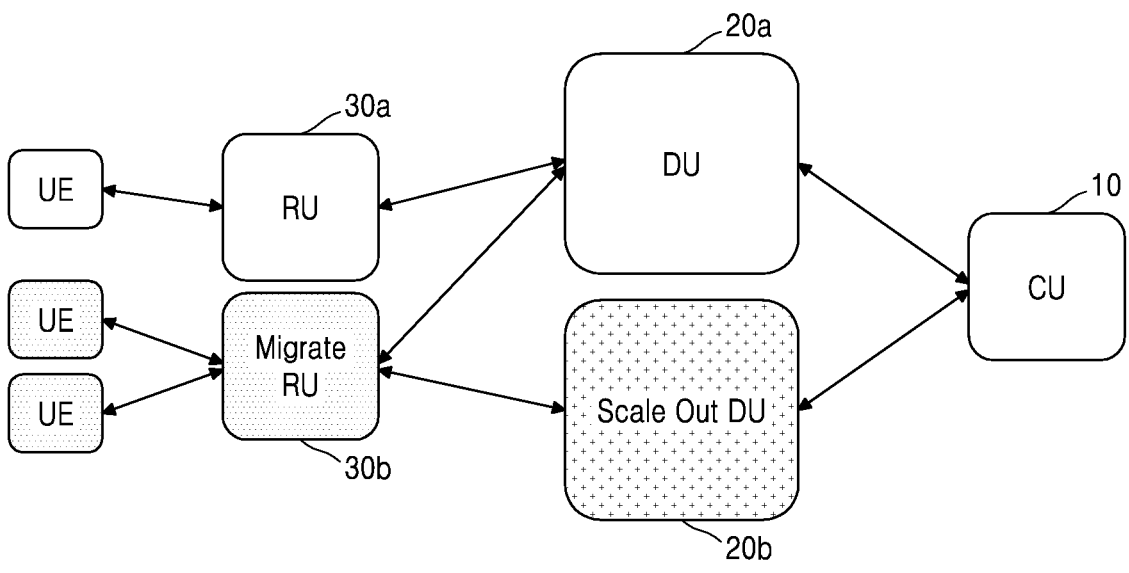
Figure 6C:
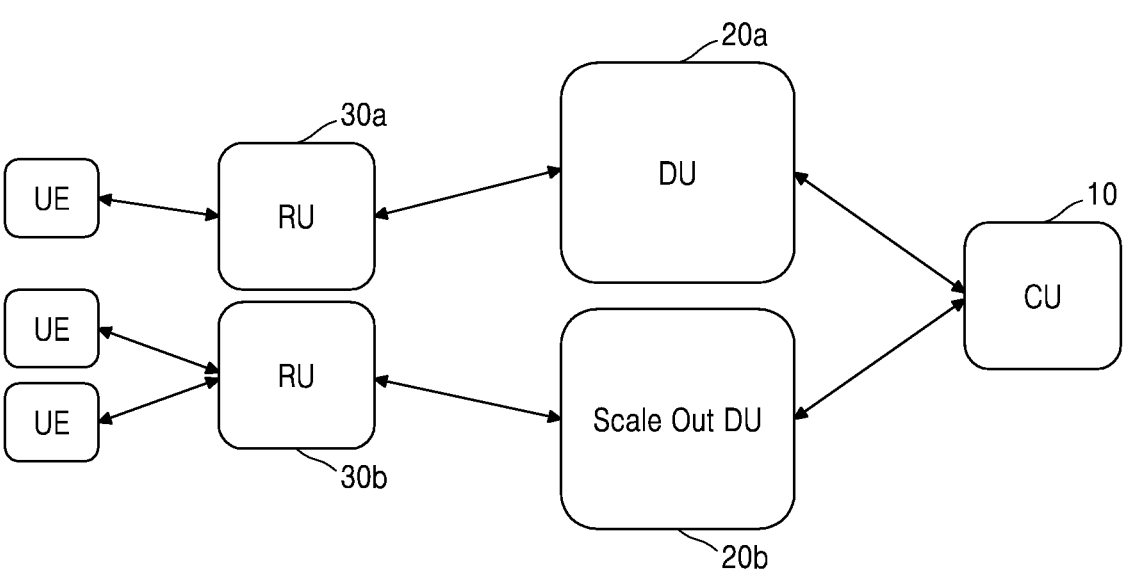

FIGS. 6A to 6C illustrate diagrams for describing a method of scaling out of a DU, according to an embodiment of the disclosure.

FIG. 6A illustrates a state, in one or more examples, in which the CU 10 and the first DU 20a are connected with each other and an amount of traffic is greater than a processing capability of the first DU 20*a*. FIG. 6B illustrates that a connection between the first DU 20*a* and the second DU 20*b* (e.g., via migrate RU) is performed based on a resource usage amount of the first DU 20*a*, and FIG. 6C illustrates a state in which a scaling-out procedure of the second DU 20*b* is completed.

According to an embodiment of the disclosure, the OAM 50 may identify whether a connection to the second DU 20*b* is requested, based on a resource usage amount of the first DU 20*a*. As described with reference to FIG. 3, an amount of traffic per time may be changed, and thus, the resource usage amount of the first DU 20*a* may also be changed. The OAM 50 may determine and/or identify the necessity of an additional connection between the first DU 20*a* and the second DU 20*b* based on traffic information or resource information. For example, if the amount of traffic exceeds a traffic threshold, or an amount of resources being used exceeds a resource threshold, it may be determined that an additional connection between the first DU 20*a* and the second DU 20*b* is necessary.

According to an embodiment of the disclosure, the OAM 50 may periodically obtain resource information of the first DU 20*a*. When it is determined that connection to the second DU 20*b* is requested, based on the obtained information, the OAM 50 may activate the second DU 20*b*. Also, the OAM 50 may select and/or determine at least one RU 30*b* to be connected to the second DU 20*b* from among one or more RUs 30*a* and 30*b* connected to the first DU 20*a*. The selecting of the at least one RU 30*b* to be connected to the second DU 20*b* may be determined based on UE information, traffic information, resource information, or the like. The OAM 50 may provide the first DU 20*a* or the second DU 20*b* with information about the determined RU 30*b*. The second DU 20*b* and the selected and/or determined RU 30*b* may set up a fronthaul interface so as to transmit or receive a packet. According to an embodiment of the disclosure, the RU 30*b* set up the fronthaul interface with the second DU 20*b* may release connection to the first DU 20*a*.

According to an embodiment of the disclosure, the CU 10 may not recognize the second DU 20*b* as a separate DU, but may recognize the second DU 20*b* and the first DU 20*a* as one DU by grouping them. For example, the CU 10 may set up the F1 interface by obtaining only an IP of the first DU 20*a*, while not separately obtaining an IP with respect to the second DU 20*b*. Therefore, the CU 10 may directly receive a packet with only the first DU 20*a*, and may receive a packet with the second DU 20*b* via the first DU 20*a*. An inter-DU interface may be set up for packet transmission and reception between the first DU 20*a* and the second DU 20*b*.

According to an embodiment of the disclosure, the first DU 20*a* may identify whether to transmit data to the second DU 20*b* according to the content of a DL packet transmitted from the CU 10. In one or more examples, the first DU 20*a* may forward UL data to the CU 10 or may combine the UL data with other UL data and transmit the combination to the CU 10 according to the content of a UL packet transmitted from the second DU 20*b*. Hereinafter, a particular method of processing a DL/UL will now be described in detail with reference to FIGS. 7 and 8.

Figure 7:
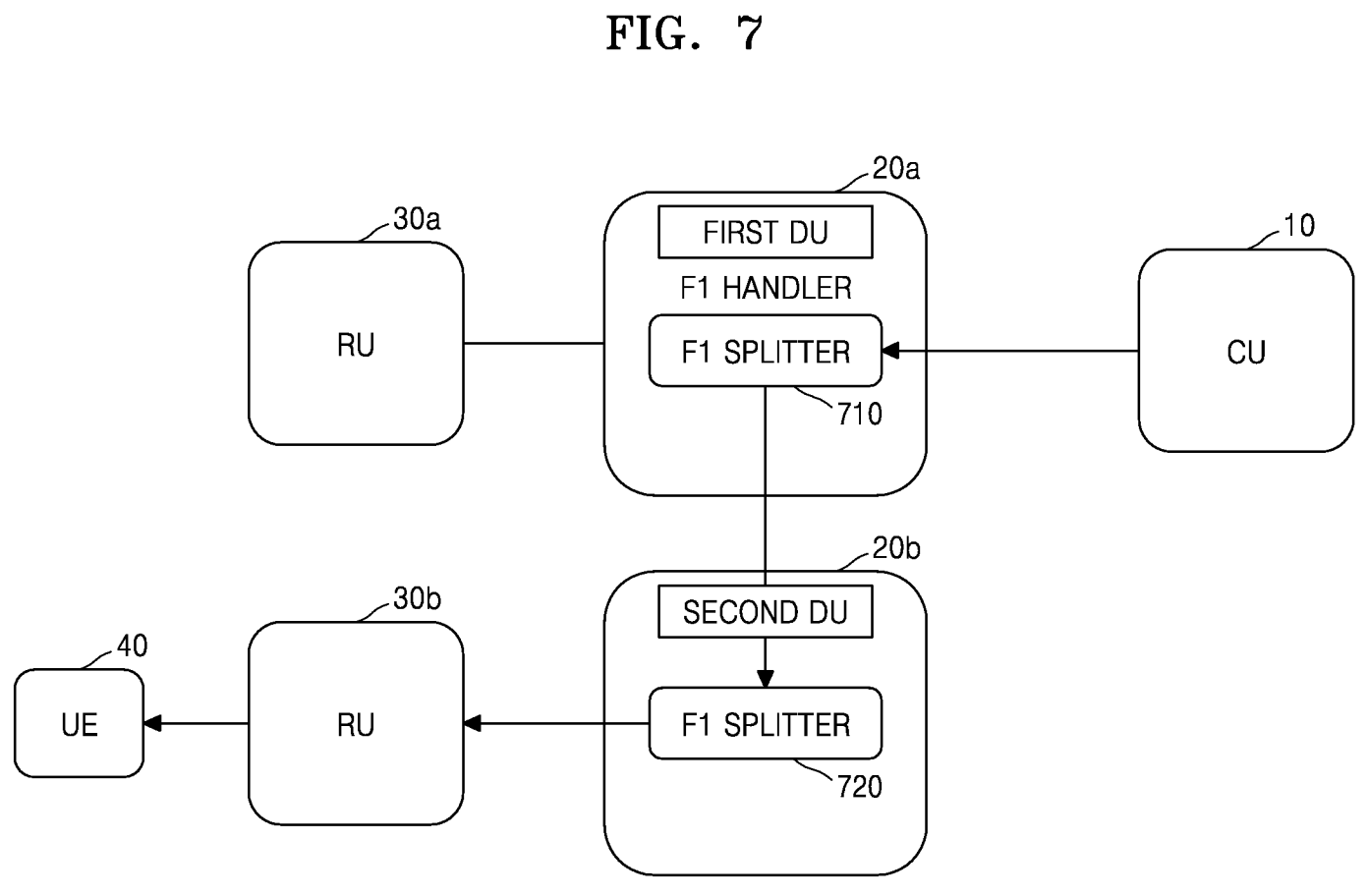

FIG. 7 illustrates a diagram for describing a method of processing a DL packet when scaling out is performed, according to an embodiment of the disclosure.

Referring to FIG. 7, a DL packet from the CU 10 may be transmitted to the first DU 20*a* via an F1 interface. According to the content of a transmitted packet, the first DU 20*a* may directly process the DL packet or may transmit the DL packet to the second DU 20*b* via an inter-DU interface. According to the content of the transmitted DL packet, the packet transmitted to the second DU 20*b* may be transmitted to at least one RU 30*b* connected to the second DU 20*b* or may be transmitted to the UE 40 connected to the RU 30*b*.

The DL packet transmitted from the CU 10 may include a control plane packet or a user plane packet. The control plane packet may include a UE associated signaling message or a non-UE associated signaling message. The control plane DL message may correspond to a control plane DL listed in 3GPP TS38.473. Hereinafter, the message will now be described in detail.

The UE associated signaling message may be a message for one or more of the procedures specified below:
    UE context management procedures;
    Some procedures among RRC message transfer procedures;
    Some procedures among positioning procedures; and
    Trace procedures.
    The non-UE associated signaling message may be a message for one or more of the procedures specified below:
    Interface management procedures;
    Warning message transfer procedures;
    System information procedures;
    Paging procedures;
    Some procedures among RRC message transfer procedures;
    Radio information transfer procedures;
    Integrated access and backhaul (IAB) procedures;
    Self-optimization Support procedures;
    Some procedures among positioning procedures; and
    Reference time information reporting procedures.
    A GTP-U message may include one or more of the messages specified below:
    Path management message
        Echo Request
        Echo response
        Supported extension headers notification
    Tunnel management messages
        Error indication
        End marker
        Tunnel status According to an embodiment of the disclosure, an F1 splitter 710 of the first DU 20*a* may identify whether to perform transmission to the second DU 20*b* according to the content of a DL packet received from the CU 10. Hereinafter, descriptions of the F1 splitter are provided.

In a case of a UE-associated message of a control plane, as a target UE of the message is configured, a target RU or DU may exist. According to one or more embodiments of the disclosure, the target UE may be indicated by a UE F1AP identifier (ID) included in the message. For example, in a case of DL RRC message transmission, CU UE F1AP ID and DU UE F1AP ID may be essential. For UE F1AP ID, CU UE F1AP ID and DU UE F1AP ID exist but may be interchangeable with each other, and thus, are referred to as UE F1AP ID, for convenience of descriptions. The F1 splitter 710 may generate and manage a table or a hash table with respect to UE F1AP ID. According to an embodiment of the disclosure, the table or the hash table may be referred to as a F1AP ID table. The F1 splitter 710 may identify a DU or an RU to process a message, by using the generated table or hash table.

For example, the RU 30*a* identified by UE F1AP ID may be in a connected state with respect to the first DU 20*a*. The F1 splitter 710 may identify UE F1AP ID by using the table, and may not transmit the corresponding message to the second DU 20b. The F1 splitter 710 may allow the first DU 20a to directly process the message or may transmit the message to at least one RU 30a connected to the first DU 20a, according to the content of the message. In one or more examples, the RU 30b identified by UE F1AP ID may be in a connected state with respect to the second DU 20b. The F1 splitter 710 may transmit the message to the second DU 20b via an inter-DU interface, according to UE F1AP ID. The F1 splitter 720 of the second DU 20b which has received the message may allow the second DU 20b to directly process the message or may transmit the message to at least one RU 30b connected to the second DU 20b according to the content of the message.

In a case of a non-UE associated message of the control plane, since a target UE of the message is not configured, a target RU is not determined. In one or more examples, since a target DU is not determined, the non-UE associated message may be transmitted to all DUs. The F1 splitter 710 of the first DU 20a may transmit the non-UE associated message of the control plane to the second DU 20b via the inter-DU interface. The F1 splitters 710 and 720 of respective DUs may control the DUs 20a and 20b to directly process a message or may transmit the message to at least one RU 30a or 30b connected to the DU 20a or 20b according to the content of the message.

In a case of a message of the user plane, as a target UE of the message is configured, a target RU or DU may exist. According to an embodiment of the disclosure, the target UE may be indicated by a tunnel endpoint identifier (TEID) included in the message. A TEID value may be allocated when a data radio bearer (DRB) of a specific UE is generated, and may always be associated with the specific UE. The F1 splitter 710 may generate and manage a table or a hash table which stores TEID values formed when the DRB is generated. According to an embodiment of the disclosure, the table or the hash table may be referred to as the TEID table. The F1 splitter 710 may identify a DU or an RU to process a message by using the generated table or hash table.

For example, the RU 30a connected to a UE identified by a TEID may be in a connected state with respect to the first DU 20a. The F1 splitter 710 may identify the TEID by using the table, and may not transmit the corresponding message to the second DU 20b. The F1 splitter 710 may allow the first DU 20a to directly process the message or may transmit the message to at least one RU 30a connected to the first DU 20a, according to the content of the message. In one or more examples, the RU 30b connected to the UE identified by the TEID may be in a connected state with respect to the second DU 20b. The F1 splitter 710 may transmit the message to the second DU 20b via the inter-DU interface according to the identified TEID. The F1 splitter 720 of the second DU 20b which has received the message may identify whether to process the message by the second DU 20b or may transmit the message to at least one RU 30b connected to the second DU 20b according to a type of the message.

Figure 8:
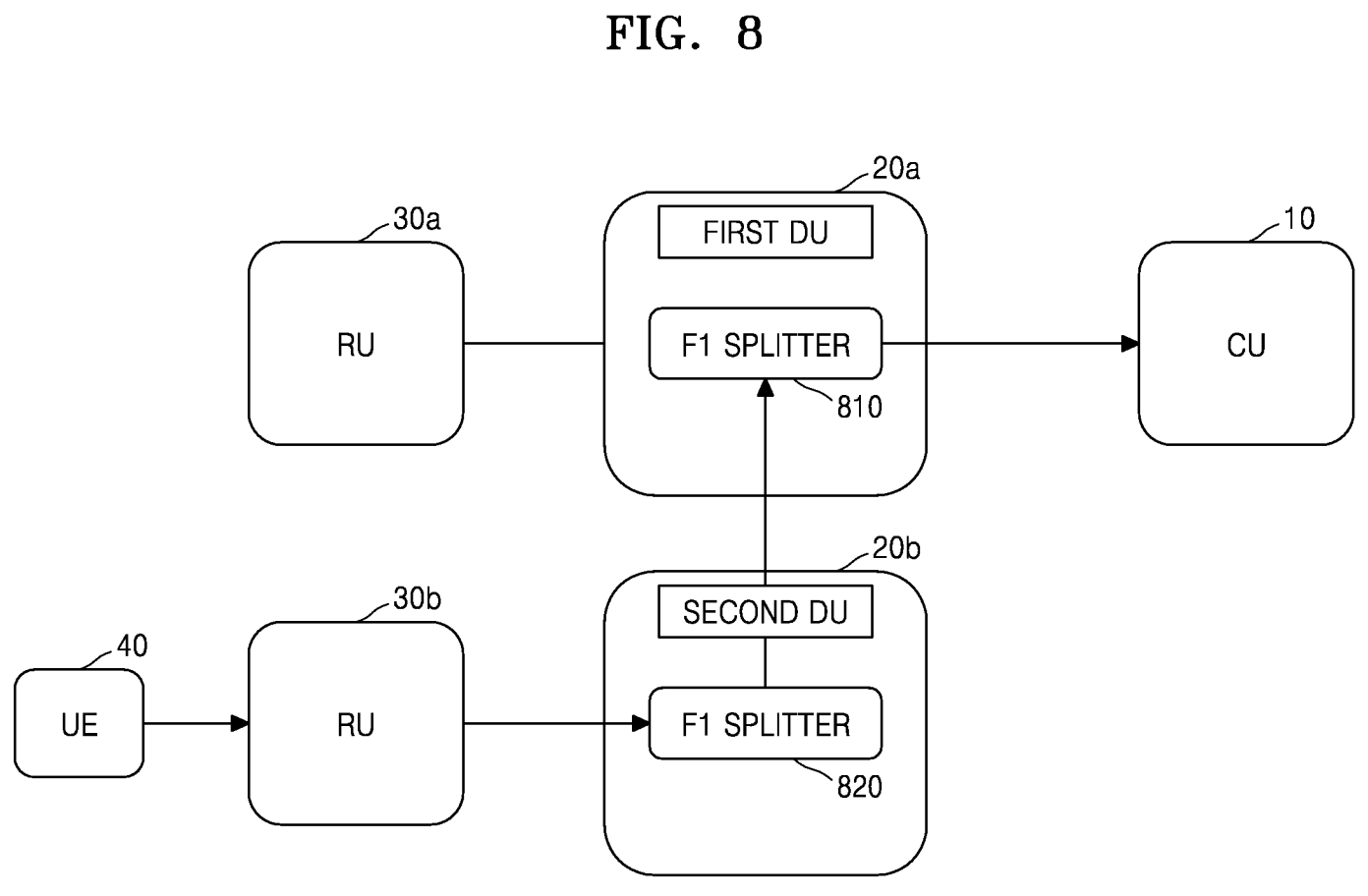

FIG. 8 illustrates a diagram for describing a method of processing a UL packet when scaling out is performed, according to an embodiment of the disclosure.

Referring to FIG. 8, the UL packet may be transmitted from an RU via a fronthaul interface or may be generated in a DU.

A UL packet received from the RU 30b or generated by the second DU 20b may be transmitted to the first DU 20a by using an F1 splitter 820 of the second DU 20b via an inter-DU interface. According to an embodiment of the disclosure, an F1 splitter 810 of the first DU 20a may transmit UL data to the CU 10 according to the content of a UL packet. In one or more examples, according to the content of the UL packet, the first DU 20a may combine a plurality of items of UL data and may transmit the combination to the CU 10. In one or more examples, when the UL data is an acknowledgement to DL data and is requested for combination, the first DU 20a may receive acknowledgements from a plurality of DUs having received the DL data, may combine the acknowledgements, and may transmit the combination to the CU 10. When content of the UL data does not request separate combination, the first DU 20a may immediately forward the UL data received from the second DU 20b to the CU via an F1 interface.

Figure 9:
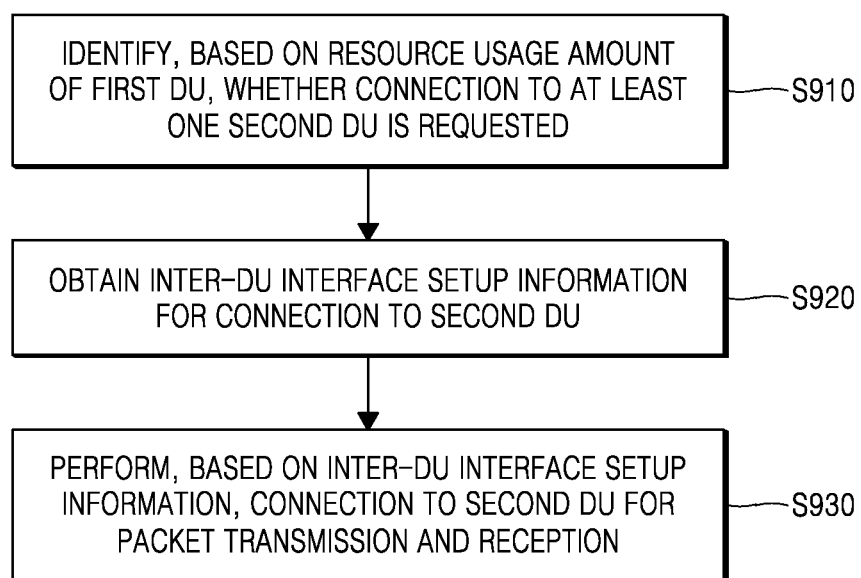
FIG. 9 illustrates a diagram for describing a method of scaling out of a DU, according to an embodiment of the disclosure.

FIG. 9 illustrates a diagram for describing a method of scaling out of a DU, according to an embodiment of the disclosure.

In operation S910, the first DU 20a may identify, based on a resource usage amount of the first DU 20a, whether a connection to at least one second DU 20b is requested. As described with reference to FIG. 3, the resource usage amount of the first DU 20a may be changed depending on an amount of traffic according to a time or situation, as illustrated in FIG. 3.

According to an embodiment of the disclosure, the OAM 50 may obtain resource information or traffic information of the first DU 20a, and may identify whether the connection to the at least one second DU 20b is requested based on the information. According to an embodiment of the disclosure, the OAM 50 may periodically obtain information about a resource usage amount of the first DU 20a. In one or more examples, the OAM 50 may identify whether the second DU 20b is connected, based on the obtained information, and may activate the second DU 20b. For example, when an amount of traffic is greater than processing capability of the first DU 20a, the OAM 50 may determine that the connection to at least one second DU 20b is requested. In one or more examples, when a resource usage amount of the first DU 20a is equal to or greater than a preset value, the OAM 50 may determine that the connection to the second DU 20b is requested. When it is determined that the connection to the second DU 20b is requested, the OAM 50 may notify the first DU 20a or the second DU 20b of a result of the identifying. According to an embodiment of the disclosure, the first DU 20a may determine, based on the resource information or the traffic information, whether connection to the second DU 20b is requested.

In operation S920, the first DU 20a may obtain inter-DU interface setup information for connection to the second DU 20b. In one or more examples, an inter-DU interface is an interface set up to transceive data between DUs 20. An F1 splitter may transmit or receive a packet between DUs via the inter-DU interface.

The first DU 20a may obtain the inter-DU interface setup information from the OAM 50. According to an embodiment of the disclosure, the inter-DU interface setup information may include F1 interface setup information between the first DU 20a and the CU 10. For example, the inter-DU interface setup information may include an F1AP message or F1 interface setup values.

According to an embodiment of the disclosure, the second DU 20b may request the first DU 20a for the inter-DU interface setup information. In response to the request, the first DU 20a may transmit pre-obtained inter-DU interface setup information to the second DU 20b or may obtain inter-DU interface setup information from the OAM 50 and may transmit the obtained inter-DU interface setup information. According to an embodiment of the disclosure, the inter-DU interface setup information may include setup values requested for connection of the second DU 20b.

In operation S930, the first DU 20a may perform, based on the obtained inter-DU interface setup information, connection to the second DU 20b for packet transmission and reception.

According to an embodiment of the disclosure, when connection between the first DU 20a and the second DU 20b is performed, an F1 splitter and an inter-DU handler of each of the first DU 20a and the second DU 20b may be activated. The F1 splitter may identify content of data and may transmit the data to a target object. The inter-DU handler may control transmission and reception of the data based on an inter-DU interface.

According to an embodiment of the disclosure, based on the inter-DU interface setup information, UE information, or the traffic information, the OAM 50 may determine at least one RU to be connected to a DU according to scaling out. The determined at least one RU may set up a fronthaul interface with the scaled-out DU and may transmit or receive a packet. The OAM 50 may transmit information about the determined RU to the first DU 20a or the second DU 20b. The information about the RU may include information about at least one UE to be connected to the RU.

According to an embodiment of the disclosure, the first DU 20a may transmit a packet to the second DU 20b or may receive the packet from the second DU 20b according to the content of the packet. In one or more examples, a DU may transmit a packet to an RU connected to the DU or may receive a packet from the RU. For example, in a case of a UE-associated message or a user plane message from among DL packets, there may be a UE targeted by the message. Therefore, the F1 splitter may determine whether to transmit the message to the second DU 20b based on a pre-generated table or hash table. In one or more examples, the F1 splitter may allow the DU 20 to directly process the message or may transmit the message to the RU 30 according to the content of the message. In a case of a non-UE associated message from among DL packets, there is not a UE targeted by the message. Therefore, all DUs are a target of the message, and thus, the F1 splitter may transmit the message to the second DU 20b. The F1 splitter may allow the DU 20 to directly process the message or may transmit the message to the RU 30 according to the content of the message. A UL packet may be transmitted to the DU 20 from the RU 30 via the fronthaul interface or may be generated by the DU 20. A UL packet received to the second DU 20b from the RU 30 or generated by the second DU 20b may be transmitted to the first DU 20a via the inter-DU interface by using the F1 splitter. The first DU 20a may forward the UL packet to the CU 10 or may combine the UL packet with other UL packet and transmit the combination to the CU 10 according to the content of the UL packet. For example, when UL data is an acknowledgement to DL data, the first DU 20a may combine a plurality of acknowledgements and may transmit the combination to the CU 10 via the F1 interface.

FIG. 10 illustrates a diagram for describing a method of scaling in of a DU, according to an embodiment of the disclosure. Hereinafter, operation that overlaps that of FIG. 9 is not described in detail for brief description of the specification.

In operation S1010, the first DU 20a may identify, based on a resource usage amount of the first DU 20a, whether a connection to at least one second DU 20b is requested. As described with reference to FIG. 3, the resource usage amount of the first DU 20a may be changed depending on an amount of traffic according to a time or situation.

In operation S1020, the first DU 20a may obtain inter-DU interface setup information for connection to the second DU 20b. An inter-DU interface may be an interface set up to transceive data between DUs. According to an embodiment of the disclosure, the inter-DU interface setup information may include F1 interface setup information between the first DU 20a and the CU 10. In one or more examples, the second DU 20b may request the first DU 20a for the inter-DU interface setup information.

In operation S1030, the first DU 20a may perform, based on the obtained inter-DU interface setup information, connection to the second DU 20b for packet transmission and reception. According to an embodiment of the disclosure, when connection between the first DU 20a and the second DU 20b is performed, an F1 splitter and an inter-DU handler of each of the first DU 20a and the second DU 20b may be activated. In one or more examples, based on the inter-DU interface setup information or traffic information, the OAM 50 may determine at least one RU to be connected to a scaled-out DU. The determined at least one RU and the scaled-out DU may set up a fronthaul interface and may transmit or receive a packet.

According to an embodiment of the disclosure, the first DU 20a may transmit a packet to the second DU 20b or may receive the packet from the second DU 20b, according to the content of the packet. In one or more examples, a DU may transmit a packet to an RU connected to the DU or may receive a packet from the RU. In a case of a DL packet, an F1 splitter of the first DU 20a may determine whether to transmit a packet to the second DU 20b, according to a type of the packet. In a case of a UL packet, an F1 splitter of the first DU 20a may forward a packet received from the second DU 20b to the CU 10 or may combine the packet with other UL packet and may transmit the combination to the CU 10.

In operation S1040, the first DU 20a may release the connection to at least one second DU 20b based on a resource usage amount of the first DU 20a. As described with reference to FIG. 3, the resource usage amount of the first DU 20a may be changed depending on an amount of traffic according to a time or situation. For example, when the amount of traffic falls below a traffic threshold or the amount of resource usage falls below a resource threshold, the connection to the at least one second DU 20b may be released.

According to an embodiment of the disclosure, the OAM 50 may obtain resource information or traffic information of the first DU 20a, and may identify whether connection to at least one second DU 20b is requested, based on the information. In one or more examples, the OAM 50 may deactivate the second DU 20b, based on a result of the identifying. For example, when an amount of traffic is smaller than processing capability of the first DU 20a, the OAM 50 may determine that connection to the second DU 20b is unnecessary. In one or more examples, when the resource usage amount of the first DU 20a is equal to or smaller than a preset value, the OAM 50 may determine that connection to the second DU 20b is unnecessary. When it is determined that connection to the second DU 20b is unnecessary, the OAM 50 may notify the first DU 20a or the second DU 20b of a result of the identifying.

According to an embodiment of the disclosure, when it is determined that connection to the second DU 20b is unnecessary, the F1 splitter and the inter-DU hander of each of the first DU 20a and the second DU 20b may be deactivated. In one or more examples, at least one RU connected to the second DU 20*b* may be reconnected to the first DU 20*a*. The first DU 20*a* may transceive a packet with the RU via the fronthaul interface.

Figure 11:
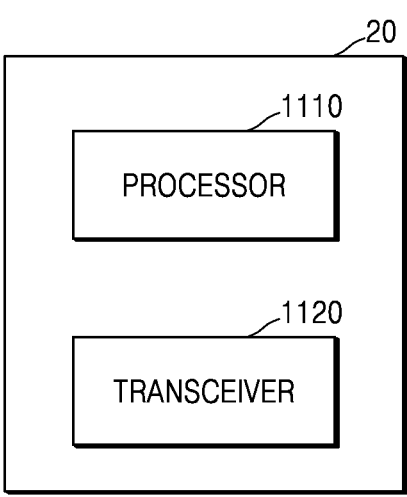
FIG. 11 illustrates a block diagram of a DU according to an embodiment of the disclosure.

FIG. 11 illustrates a block diagram of the DU 20 according to an embodiment of the disclosure.

Referring to FIG. 11, the DU 20 according to an embodiment of the disclosure may include a processor 1110, a transceiver 1120, and a memory. However, elements of the DU 20 are not limited to the example above. For example, the DU 20 may include more elements than the aforementioned elements or may include fewer elements than the aforementioned elements. In an embodiment of the disclosure, the processor 1110, the memory, and the transceiver 1120 may be implemented as one chip.

The processor 1110 may include one or more processors. In this case, the one or more processors may each be a general-purpose processor such as a central processing unit (CPU) an application processor (AP), a digital signal processor (DSP), or any other processor type known to one of ordinary skill in the art.

The processor 1110 may control a series of processes to allow the DU 20 to operate according to the aforementioned embodiments of the disclosure. For example, the processor 1110 may receive a control signal and a data signal by using the transceiver 1120, and may process the received control signal and the received data signal. The processor 1110 may transmit the processed control signal and the processed data signal by using the transceiver 1120, and may detect an event. In one or more examples, the processor 1110 may control input data to be controlled based on a predefined operation rule or an artificial intelligence (AI) model which are stored in the memory, the input data being derived from the received control signal and the received data signal. The processor 1110 may record data to and read data from the memory. The processor 1110 may perform functions of a protocol stack which are requested by the communication rules. According to an embodiment of the disclosure, the processor 1110 may include at least one processor. In an embodiment of the disclosure, a part of the transceiver 1120 or the processor 1110 may be referred to as a communication processor (CP). According to an embodiment of the disclosure, the processor 1110 may activate or deactivate an F1 handler, an F1 splitter, and an inter-DU handler of the DU 20, and may configure an inter-DU interface.

The memory may store programs and data necessary for operations of the DU 20. In one or more examples, the memory may store control information or data which are included in a signal obtained by the DU 20. In one or more examples, the memory may store the predefined operation rule or the AI model which are used by the DU 20. The memory may be implemented as a storage medium including a read-only memory (ROM), a random access memory (RAM), a hard disk, a compact disc (CD) ROM (CD-ROM), a digital versatile disc (DVD), or the like, or any combination thereof. In one or more examples, the memory may not be separately arranged but may be included in the processor 1110. The memory may be configured as a volatile memory, a non-volatile memory, or a combination of a volatile memory and a non-volatile memory. The memory may provide stored data in response to a request by the processor 1110.

A transmitter and a receiver of the DU 20 may be collectively referred to as the transceiver 1120, and the transceiver 1120 of the DU 20 may transmit or receive a signal to or from a BS or a network entity. The signal transmitted to or received may include control information and data. For example, the transceiver 1120 may include a radio frequency (RF) transmitter for up-converting a frequency of and amplifying signals to be transmitted, and an RF receiver for low-noise-amplifying and down-converting a frequency of received signals. However, these configurations are merely an example of the transceiver 1120, and thus, elements of the transceiver 1120 are not limited to the RF transmitter and the RF receiver. For example, the transceiver 1120 may receive a signal via a wireless channel and output the signal to the processor 1110, and may transmit a signal output from the processor 1110, via a wireless channel. The transceiver 1120 may transmit or receive data between DUs via an inter-DU interface.

Figure 12:
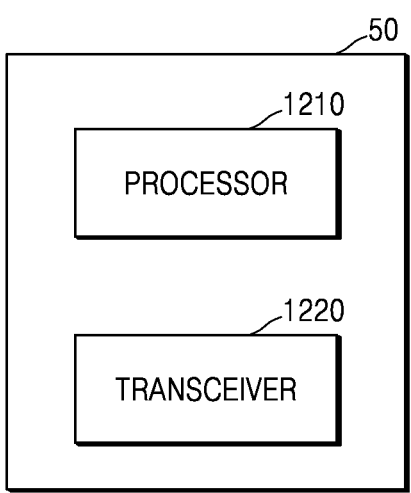
FIG. 12 illustrates a block diagram of an operation administration maintenance (OAM) entity according to an embodiment of the disclosure.

FIG. 12 illustrates a block diagram of an OAM according to an embodiment of the disclosure.

Referring to FIG. 12, the OAM 50 according to the disclosure may include a processor 1210, a transceiver 1220, and a memory. However, elements of the OAM 50 are not limited to the example above. For example, the OAM 50 may include more elements than the aforementioned elements or may include fewer elements than the aforementioned elements. In an embodiment of the disclosure, the processor 1210, the memory, and the transceiver 1220 may be implemented as one chip.

The processor 1210 may include one or more processors. In this case, the one or more processors may each be a general-purpose processor such as a CPU an AP, a DSP, or any other processor type known to one of ordinary skill in the art The processor 1210 may control a series of processes to allow the OAM 50 to operate according to the aforementioned embodiments of the disclosure. For example, the processor 1210 may receive a control signal and a data signal by using the transceiver 1220, and may process the received control signal and the received data signal. The processor 1210 may transmit the processed control signal and the processed data signal by using the transceiver 1220, and may detect an event. In one or more examples, the processor 1210 may control input data to be controlled based on a predefined operation rule or an AI model which are stored in the memory, the input data being derived from the received control signal and the received data signal. The processor 1210 may record data to and read data from the memory. The processor 1210 may perform functions of a protocol stack which are requested by the communication rules. According to an embodiment of the disclosure, the processor 1210 may include at least one processor. In an embodiment of the disclosure, a part of the transceiver 1220 or the processor 1210 may be referred to as a CP. According to an embodiment of the disclosure, the processor 1210 may allow the OAM 50 to identify, based on traffic information or resource information, necessity of additional DU connection.

The memory may store programs and data necessary for operations of the OAM 50. In one or more examples, the memory may store control information or data which are included in a signal obtained by the OAM 50. In one or more examples, the memory may store the predefined operation rule or the AI model which are used by the OAM 50. The memory may be implemented as a storage medium including a ROM, a RAM, a hard disk, a CD-ROM, a DVD, or any other memory structure known to one of ordinary skill in the art, or any combination thereof. In one or more examples, the memory may not be separately arranged but may be included in the processor 1210. The memory may be configured as a volatile memory, a non-volatile memory, or a combination of a volatile memory and a non-volatile memory. The memory may provide stored data, in response to a request by the processor 1210.

A transmitter and a receiver of the OAM 50 may be collectively referred to as the transceiver 1220, and the transceiver 1220 of the OAM 50 may transmit or receive a signal to or from a BS or a network entity. The signal transmitted to or received may include control information and data. For example, the transceiver 1220 may include a RF transmitter for up-converting a frequency of and amplifying signals to be transmitted, and an RF receiver for low-noise-amplifying and down-converting a frequency of received signals. However, these configurations are merely an example of the transceiver 1220, and thus, elements of the transceiver 1220 are not limited to the RF transmitter and the RF receiver. For example, the transceiver 1220 may receive a signal via a wireless channel and output the signal to the processor 1210, and may transmit a signal output from the processor 1210, via a wireless channel. The transceiver 1220 may receive traffic or resource information, and may transmit a result of identifying necessity of additional DU connection based on the received information.

According to an embodiment of the disclosure, a method of performing communication by a first distributed unit (DU) in a wireless communication system may include identifying, based on resource usage amount information of the first DU, whether a connection to at least one second DU is requested, obtaining, based on a result of the identifying, inter-DU interface setup information for the connection to the at least one second DU, and based on the obtained inter-DU interface setup information, performing connection to the at least one second DU for transmission and reception of one or more packets.

According to an embodiment of the disclosure, the first DU may receive, from the at least one second DU, a request for the inter-DU interface setup information, may transmit the inter-DU interface setup information to the at least one second DU, and may perform the connection to the at least one second DU, based on the inter-DU interface setup information.

According to an embodiment of the disclosure, the inter-DU interface setup information may include F1 interface setup information received from a CU connected to the first DU.

According to an embodiment of the disclosure, each of the first DU and the at least one second DU may include an F1 splitter, and the first DU may transmit or receive one or more packets to or from and the at least one second DU via an inter-DU interface by using the F1 splitter.

According to an embodiment of the disclosure, based on the one or more packets comprising a UE associated signaling message from among one or more control plane packets, the first DU may identify whether to transmit the UE associated signaling message to the at least one second DU, based on a UE F1AP ID included in the UE associated signaling message.

According to an embodiment of the disclosure, based on the one or more packets comprising a non-UE associated signaling message from among one or more control plane packets, the first DU may transmit the non-UE associated signaling message to the at least one second DU.

According to an embodiment of the disclosure, based on the one or more packets comprising a user plane packet, the first DU may identify whether to transmit the user plane packet to the at least one second DU, based on a TEID included in a GTP-U protocol.

According to an embodiment of the disclosure, the first DU may receive one or more packets from the at least one second DU, and may transmit the one or more packets received from the at least one second DU to a CU.

According to an embodiment of the disclosure, the first DU may release the connection to the at least one second DU, based on the resource usage amount information of the first DU.

According to an embodiment of the disclosure, a method of performing communication by at least one second DU in a wireless communication system may include identifying, based on resource usage amount information of a first DU, whether a connection to the first DU is requested, obtaining, based on a result of the identifying, inter-DU interface setup information for the connection to the first DU, and based on the obtained inter-DU interface setup information, performing connection to the first DU for transmission and reception of one or more packets.

According to an embodiment of the disclosure, the second DU may transmit, to the first DU, a request for the inter-DU interface setup information, may receive the inter-DU interface setup information from the first DU, and may perform the connection to the first DU, based on the inter-DU interface setup information.

According to an embodiment of the disclosure, each of the first DU and the at least one second DU may include an F1 splitter, and the at least one second DU may transmit or receive one or more packets to or from the first DU via the inter-DU interface by using the F1 splitter.

According to an embodiment of the disclosure, based on the one or more packets comprising UE associated signaling message from among one or more control plane packets, the at least one second DU may identify whether to receive the UE associated signaling message, based on a UE F1AP ID included in the UE associated signaling message.

According to an embodiment of the disclosure, based on the one or more packets comprising a non-UE associated signaling message from among one or more control plane packets, the at least one second DU may receive the non0UE associated signaling message from the first DU.

According to an embodiment of the disclosure, based on the packets comprising a user plane packet, the at least one second DU may identify whether to receive the user plane packet, based on a TEID included in a GTP-U protocol.

According to an embodiment of the disclosure, the at least one second DU may transmit the one or more packets to the first DU, and the one or more packets may be transmitted to a CU by the first DU.

According to an embodiment of the disclosure, the at least one second DU may release the connection to the first DU, based on the resource usage amount information of the first DU.

According to an embodiment of the disclosure, a method of performing communication by an OAM entity in a wireless communication system may include identifying, based on resource usage amount information of a first DU, whether a connection to at least one second DU is requested, transmitting inter-DU interface setup information for connection to the first DU or the at least one second DU, and identifying a first radio unit (RU) to be migrated to the at least one second DU from among at least one RU connected to the first DU, wherein the connection for transmission and reception of one or more packets is performed between the first DU and the at least one second DU, based on the inter-DU interface setup information.

According to an embodiment of the disclosure, a first DU for performing communication in a wireless communication system may include a transceiver, and at least one processor coupled with the transceiver. The at least one processor may be configured to identify, based on resource usage amount information of the first DU, whether connection to at least one second DU is requested, obtain, based on a result of the identifying, inter-DU interface setup information for a connection to the at least one second DU, and based on the obtained inter-DU interface setup information, perform the connection to the at least one second DU for transmission and reception of one or more packets.

According to an embodiment of the disclosure, a second DU for performing communication in a wireless communication system may include a transceiver, and at least one processor coupled with the transceiver. The at least one processor may be configured to identify, based on resource usage amount information of a first DU, whether a connection to the first DU is requested, obtain inter-DU interface setup information for the connection to the first DU, and based on the obtained inter-DU interface setup information, perform connection to the first DU for transmission and reception of one or more packets.

According to an embodiment of the disclosure, an OAM entity for performing communication in a wireless communication system may include a transceiver, and at least one processor coupled with the transceiver. The at least one processor may be configured to identify, based on resource usage amount information of a first DU, whether a connection to at least one second DU is requested, transmit inter-DU interface setup information for the connection to the first DU or the at least one second DU, and identify a first RU to be migrated to the at least one second DU from among at least one RU connected to the first DU, wherein connection for transmission and reception of one or more packets is performed between the first DU and the at least one second DU, based on the inter-DU interface setup information.

A computer-readable storage medium may be provided in the form of a non-transitory storage medium. Here, the term 'non-transitory storage medium' means that the storage medium is a tangible entity and does not include a signal (e.g., an electromagnetic wave), and the term does not distinguish that data is stored semi-permanently or temporarily on the storage medium. For example, the non-transitory storage medium may include a buffer in which data is temporarily stored.

According to an embodiment of the disclosure, a method according to various embodiments of the disclosure may be provided in a computer program product. The computer program product may be traded between a seller and a purchaser as a commodity. The computer program product may be distributed in the form of a machine-readable storage medium (e.g., CD-ROM), or may be distributed online (e.g., downloaded or uploaded) through an application store or directly between two user devices (e.g., smart phones). For online distribution, at least a part of the computer program product (e.g., a downloadable app.) may be temporarily generated or be at least temporarily stored in a machine-readable storage medium such as a manufacturer's server, an application store's server, or a memory of a relay server.

What is claimed is:

1. A method of performing communication by a first distributed unit (DU) in a wireless communication system, the method comprising:
  identifying, based on resource usage amount information of the first DU, whether a connection to at least one second DU is requested;
  obtaining, based on a result of the identifying, inter-DU interface setup information for the connection to the at least one second DU; and performing, based on the inter-DU interface setup information, the connection to the at least one second DU for transmission and reception of one or more packets,
  wherein each of the first DU and the at least one second DU comprises an F1 splitter, and
  wherein the transmission and reception of the one or more packets is performed via an inter-DU interface by using the F1 splitter of the first DU and the F1 splitter of the at least one second DU.

2. The method of claim 1, wherein the performing of the connection to the at least one second DU comprises:
  receiving, from the at least one second DU, a request for the inter-DU interface setup information;
  transmitting the inter-DU interface setup information to the at least one second DU; and
  performing the connection to the at least one second DU, based on the inter-DU interface setup information.

3. The method of claim 1, wherein the inter-DU interface setup information comprises F1 interface setup information received from a centralized unit (CU) connected to the first DU.

4. The method of claim 1, further comprising:
  based on the one or more packets comprising a user equipment (UE) associated signaling message from among one or more control plane packets, identifying whether to transmit the UE associated signaling message to the at least one second DU based on a UE F1 application protocol identifier (UE F1AP ID) comprised in the UE associated signaling message.

5. The method of claim 1, further comprising:
  based on the one or more packets comprising a non-UE associated signaling message from among one or more control plane packets, transmitting the non-UE associated signaling message to the at least one second DU.

6. The method of claim 1, further comprising:
  based on the one or more packets comprising a user plane packet, identifying whether to transmit the user plane packet to the at least one second DU based on a tunnel endpoint identifier (TEID) comprised in a general packet radio service (GPRS) tunneling protocol user plane (GTP-U) protocol.

7. The method of claim 1, further comprising:
  receiving the one or more packets from the at least one second DU; and
  transmitting the received one or more packets from the at least one second DU to a CU.

8. The method of claim 1, further comprising:
  based on the resource usage amount information of the first DU, releasing the connection to the at least one second DU.

9. A method of performing communication by at least one second distributed unit (DU) in a wireless communication system, the method comprising:
  identifying, based on resource usage amount information of a first DU, whether a connection to the first DU is requested;
  obtaining, based on a result of the identifying, inter-DU interface setup information for the connection to the first DU; and
  performing, based on the inter-DU interface setup information, the connection to the first DU for transmission and reception of one or more packets,
  wherein each of the first DU and the at least one second DU comprises an F1 splitter, and

wherein the transmission and reception of the one or more packets is performed via an inter-DU interface by using the F1 splitter of the first DU and the F1 splitter of the at least one second DU.

10. The method of claim 9, wherein the performing of the connection to the first DU comprises:

transmitting, to the first DU, a request for the inter-DU interface setup information;

receiving the inter-DU interface setup information from the first DU; and performing the connection to the first DU, based on the inter-DU interface setup information.

11. The method of claim 9, wherein the inter-DU interface setup information comprises F1 interface setup information received from a centralized unit (CU) connected to the first DU.

12. The method of claim 9, further comprising:

based on the one or more packets comprising a user equipment (UE) associated signaling message from among one or more control plane packets, identifying whether to receive the UE associated signaling message based on a UE F1 application protocol identifier (UE F1AP ID) comprised in the UE associated signaling message.

13. The method of claim 9, further comprising:

based on the one or more packets comprising a non-UE associated signaling message from among one or more control plane packets, receiving the non-UE associated signaling message from the first DU.

14. The method of claim 9, further comprising:

based on the one or more packets comprising a user plane packet, identifying whether to receive the user plane packet, based on a tunnel endpoint identifier (TEID)

comprised in a general packet radio service (GPRS) tunneling protocol user plane (GTP-U) protocol.

15. The method of claim 9, further comprising:

transmitting the one or more packets to the first DU, wherein the one or more packets are transmitted to a CU by the first DU.

16. The method of claim 9, further comprising:

based on the resource usage amount information of the first DU, releasing the connection to the first DU.

17. A method of performing communication by an operation administration maintenance (OAM) entity in a wireless communication system, the method comprising:

identifying, based on resource usage amount information of a first distributed unit (DU), whether a connection to at least one second DU is requested;

transmitting, based on a result of the identifying, inter-DU interface setup information for the connection to the first DU or the at least one second DU; and identifying a first radio unit (RU) to be migrated to the at least one second DU from among at least one RU connected to the first DU, wherein a connection for transmission and reception of one or more packets is performed between the first DU and the at least one second DU, based on the inter-DU interface setup information by using an F1 splitter of the first DU and an F1 splitter of the at least one second DU.

18. The method of claim 17, wherein the inter-DU interface setup information comprises F1 interface setup information received from a centralized unit (CU) connected to the first DU.

* * * * *